(12) United States Patent
Park et al.

(10) Patent No.: US 9,606,726 B2
(45) Date of Patent: Mar. 28, 2017

(54) METHOD OF OPERATING A DISPLAY UNIT AND A TERMINAL SUPPORTING THE SAME

(71) Applicant: Samsung Electronics Co., Ltd., Gyeonggi-do (KR)

(72) Inventors: Eunyoung Park, Seoul (KR); Chungkyu Lee, Seoul (KR); Pillsun Song, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 283 days.

(21) Appl. No.: 13/891,419

(22) Filed: May 10, 2013

(65) Prior Publication Data

US 2013/0307783 A1    Nov. 21, 2013

(30) Foreign Application Priority Data

May 15, 2012    (KR) .......................... 10-2012-0051323

(51) Int. Cl.
*G09G 5/00*     (2006.01)
*G06F 3/0488*   (2013.01)

(52) U.S. Cl.
CPC ............................... *G06F 3/04886* (2013.01)

(58) Field of Classification Search
CPC .. G06F 3/0488; G06F 3/04817; G06F 3/0416; G06F 3/0485; G06F 3/04886
See application file for complete search history.

(56) References Cited

U.S. PATENT DOCUMENTS

| | | | |
|---|---|---|---|
| 5,559,944 A * | 9/1996 | Ono ............................. | 715/841 |
| 6,011,542 A * | 1/2000 | Durrani et al. ............... | 345/156 |
| 8,402,391 B1* | 3/2013 | Doray et al. .................. | 715/834 |
| 8,525,792 B1* | 9/2013 | Lee ..................... | G06F 3/04886 345/168 |
| 8,869,059 B2* | 10/2014 | Aono .................. | G06F 3/04886 715/773 |
| 2004/0212605 A1* | 10/2004 | Fitzmaurice et al. ........ | 345/184 |
| 2004/0212617 A1* | 10/2004 | Fitzmaurice et al. ........ | 345/440 |
| 2005/0104848 A1* | 5/2005 | Yamaguchi et al. .......... | 345/156 |

(Continued)

FOREIGN PATENT DOCUMENTS

| | | |
|---|---|---|
| CN | 101159947 A | 4/2008 |
| CN | 101634932 A | 1/2010 |

(Continued)

OTHER PUBLICATIONS

"Update for Galaxy Note Drawback One-handed Operation Mode", http://smartdevice.kr/223, Feb. 20, 2012, pp. 6 and 8-10.

(Continued)

*Primary Examiner* — Amare Mengistu
*Assistant Examiner* — Crystal A Matthews
(74) *Attorney, Agent, or Firm* — Cha & Reiter, LLC.

(57) ABSTRACT

A method of operating a display unit enhances functionality of one hand control and a terminal supports the same. The method of operating the input area, output on the display unit, includes: determining whether one-hand operation mode is set; and displaying a first input module in which a key map area is displayed to be biased to a specific direction based on a center of the display unit when the one-hand operation mode is set.

26 Claims, 12 Drawing Sheets

(56) References Cited

U.S. PATENT DOCUMENTS

| | | | |
|---|---|---|---|
| 2005/0140661 A1* | 6/2005 | Collins | 345/173 |
| 2006/0007178 A1* | 1/2006 | Davis | G06F 3/04886 |
| | | | 345/173 |
| 2007/0236460 A1* | 10/2007 | Young | G06F 3/04886 |
| | | | 345/169 |
| 2008/0119237 A1* | 5/2008 | Kim | 455/566 |
| 2009/0109187 A1* | 4/2009 | Noma | 345/173 |
| 2009/0160792 A1* | 6/2009 | Morohoshi et al. | 345/173 |
| 2009/0167706 A1* | 7/2009 | Tan et al. | 345/173 |
| 2009/0295743 A1* | 12/2009 | Nakajoh | 345/173 |
| 2009/0303200 A1 | 12/2009 | Grad | |
| 2010/0013780 A1* | 1/2010 | Ikeda et al. | 345/173 |
| 2010/0134423 A1 | 6/2010 | Brisebois et al. | |
| 2010/0182264 A1* | 7/2010 | Hahn et al. | 345/173 |
| 2010/0241985 A1* | 9/2010 | Kim | G06F 3/04886 |
| | | | 715/773 |
| 2010/0317336 A1 | 12/2010 | Ferren et al. | |
| 2011/0032202 A1* | 2/2011 | Aoyagi | G06F 1/1626 |
| | | | 345/173 |
| 2011/0169737 A1* | 7/2011 | Ito | G06F 3/04845 |
| | | | 345/158 |
| 2011/0187647 A1* | 8/2011 | Woloszynski et al. | 345/168 |
| 2011/0193782 A1* | 8/2011 | Shiu et al. | 345/168 |
| 2011/0202838 A1* | 8/2011 | Han et al. | 715/702 |
| 2011/0273540 A1* | 11/2011 | Lee | G06F 3/0346 |
| | | | 348/51 |
| 2011/0316888 A1* | 12/2011 | Sachs et al. | 345/667 |
| 2012/0069231 A1* | 3/2012 | Chao | 348/333.01 |
| 2012/0075194 A1* | 3/2012 | Ferren | 345/168 |
| 2012/0113023 A1* | 5/2012 | Koch | G06F 3/04886 |
| | | | 345/173 |
| 2012/0117506 A1* | 5/2012 | Koch et al. | 715/773 |
| 2012/0154301 A1* | 6/2012 | Kang et al. | 345/173 |
| 2012/0212418 A1* | 8/2012 | Shiota | 345/168 |
| 2012/0274585 A1* | 11/2012 | Telfer et al. | 345/173 |
| 2012/0324381 A1* | 12/2012 | Cohen | G06F 3/04886 |
| | | | 715/765 |
| 2012/0327106 A1* | 12/2012 | Won | G06F 3/04883 |
| | | | 345/619 |
| 2013/0234948 A1* | 9/2013 | Jian | G06F 3/0487 |
| | | | 345/169 |
| 2013/0300672 A1* | 11/2013 | Griffin | 345/173 |
| 2013/0307801 A1* | 11/2013 | Nam | 345/173 |
| 2014/0028562 A1* | 1/2014 | St. Clair | G06F 3/0488 |
| | | | 345/168 |
| 2015/0121262 A1* | 4/2015 | Yao | G06F 3/0484 |
| | | | 715/765 |

FOREIGN PATENT DOCUMENTS

| | | |
|---|---|---|
| CN | 102375691 A | 3/2012 |
| CN | 102422246 A | 4/2012 |
| JP | 2012-003705 A | 1/2012 |
| KR | 10-1078380 B1 | 10/2011 |
| WO | 2005/076477 A1 | 8/2005 |

OTHER PUBLICATIONS

"New Firmware Upgrade for the Galaxy Note", http://mastmanban.tistory.com/698, Feb. 1, 2012, pp. 1-2.
Chinese Search Report, dated Dec. 23, 2016.

\* cited by examiner

METHOD OF OPERATING A DISPLAY UNIT AND A TERMINAL SUPPORTING THE SAME

CLAIM OF PRIORITY

This application claims, pursuant to 35 U.S.C. §119(a), priority to and the benefit of the earlier filing date of a Korean patent application filed on May 15, 2012 in the Korean Intellectual Property Office and assigned Serial No. 10-2012-0051323, the entire disclosure of which is hereby incorporated by reference.

BACKGROUND OF THE INVENTION

1. Field of the Invention

The present invention relates to an operation of an input area, and more particularly, to a method of operating a display so that an input area output on a touch screen is suitably arranged at a point which a user may easily touch, and a terminal supporting the same.

2. Description of the Related Art

Since an electronic terminal supports a specific user function and the size thereof is small so that the user may carry the electronic terminal, the electronic terminal is highlighted in many industrial and living fields. Further, in the prior art, a portable terminal integrally supporting various user functions has been introduced. Such a portable terminal provides a screen corresponding to a user function through a display unit while supporting the user function. Accordingly, the user uses a specific user function to use and enjoy contents items through a screen according to an operation of a corresponding function.

Meanwhile, to increase the size of a display unit, a technique of a full touch screen form using an entire surface of a terminal has been spotlighted in the prior art. The touch panel technique includes a capacitive type detecting change of capacitance on the screen to detect a touch thereto, and a resistive type detecting the variation in resistance according to a pressure variation on the screen during a touch to detect the touch thereto.

As the size of a display unit is increased, it is difficult to generate a signal using an input area output on the display unit. For example, an area of a display unit provided in an adopted state of a large screen makes it difficult to control an input area while gripping the terminal by a hand. In particular, since the input area receives allocation of an area of the display unit including a location which the user has a difficulty in gripping and is displayed, there is a need to move a hand or to use two hands in order to use the input area by the user. The motion of the hand in a state that the user grips the terminal by one hand lowers usability of the terminal for the user. If a case of using one hand is more difficult than a case of using two hands upon using a portable terminal, the use of the two hands lowers the usability of the terminal.

SUMMARY OF THE INVENTION

The present invention has been made in view of the above problems, and provides a method of operating a display unit so that functionality of one hand control can be maximized and a terminal supporting the same.

The present invention further provides a method of operating a display unit so that various input areas supporting generation of an input signal of the terminal can be provided as an area which can be controlled by one hand.

In accordance with an aspect of the present invention, a method of operating a display unit, includes: determining whether one-hand operation mode is set; and displaying a first input module in which a key map area is displayed to be biased to a specific direction based on a center of the display unit when the one-hand operation mode is set.

In accordance with another aspect of the present invention, a terminal for supporting an operation of an input area output on a display unit, includes: the display unit displaying a key map area including at least one key; and a controller determining whether one-hand operation mode is set, and controlling such that a first input module in which a key map area is biased to a specific direction based on a center of the display unit is displayed.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE INVENTION

Figure 1:
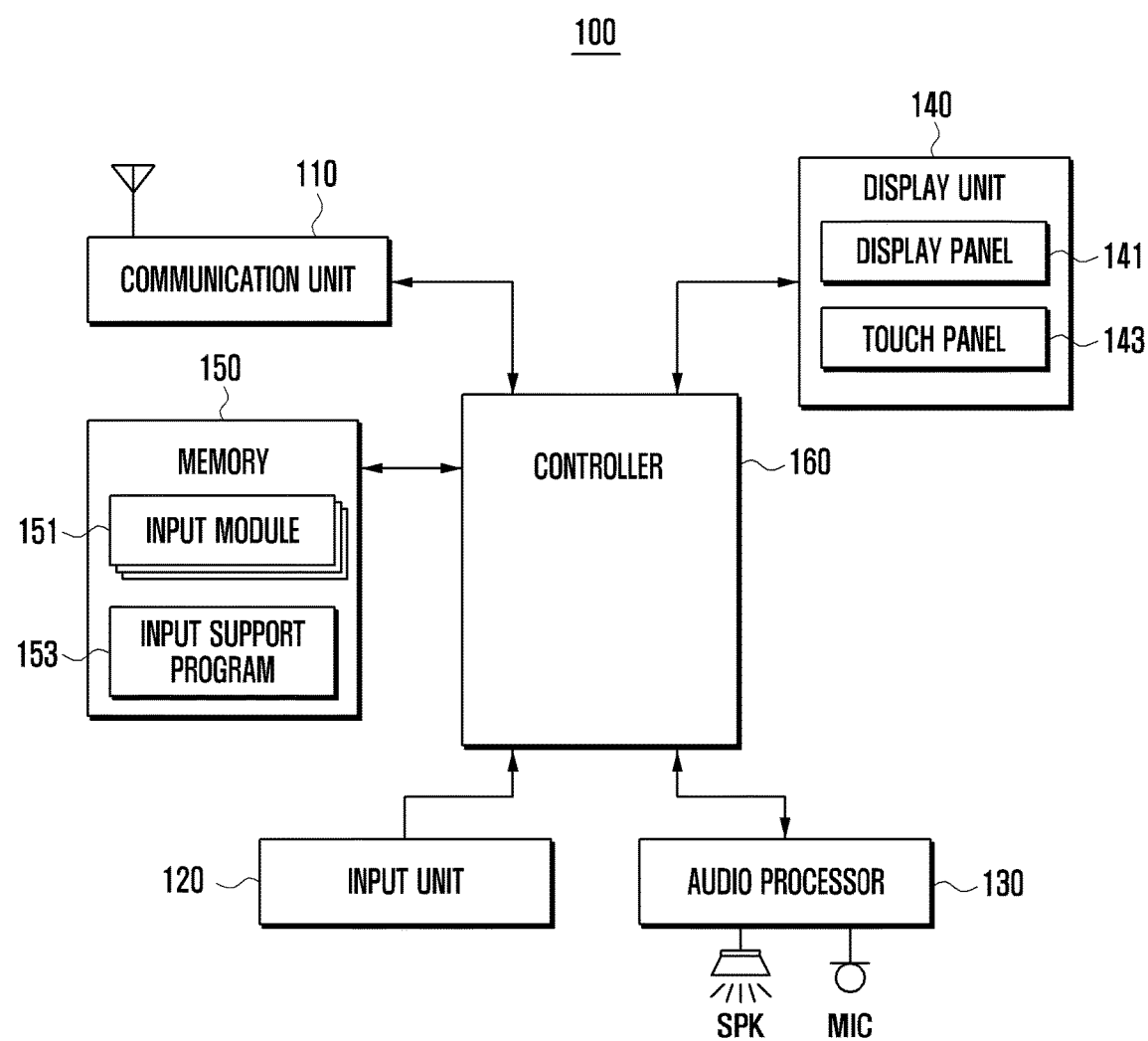
FIG. 1 is a block diagram schematically illustrating a configuration of a terminal according to an exemplary embodiment of the present invention.

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Some constituent elements shown in the drawings may be exaggerated, omitted or schematically drawn for the purpose of convenience or clarity. In addition, the size of elements does not utterly reflect an actual size. Accordingly, the present invention is not limited to a relative size and interval shown in the accompanying drawings. The present invention may, however, be embodied in many different forms and should not be construed as limited to the exemplary embodiments set forth herein. In addition, terms described herein, which are defined with reference to the functions of the present invention, may be implemented differently depending on a user or operator's intention and practice. Therefore, the terms should be understood on the basis of the disclosure throughout the specification. The principles and features of this invention may be employed in varied and numerous embodiments without departing from the scope of the invention.

Furthermore, although the drawings represent exemplary embodiments of the invention, the drawings are not necessarily to scale and certain features may be exaggerated or omitted in order to more clearly illustrate and explain the present invention.

Among the terms set forth herein, a terminal refers to any kind of device capable of processing data which is transmitted or received to or from any external entity. The terminal may display icons or menus on a screen to which stored data and various executable functions are assigned or mapped. The terminal may include a computer, a notebook, a tablet PC, a mobile device, and the like.

Among the terms set forth herein, a screen refers to a display or other output devices which visually display information to the user, and which optionally are capable of receiving and electronically processing tactile inputs from a user using a stylo, a finger of the user, or other techniques for conveying a user selection from the user to the output devices.

Among the terms set forth herein, an icon refers to a graphical element such as a figure or a symbol displayed on the screen of the device such that a user can easily select a desired function or data. In particular, each icon has a mapping relation with any function being executable in the device or with any data stored in the device and is used for processing functions or selecting data in the device. When a user selects one of the displayed icons, the device identifies a particular function or data associated with the selected icon. Then the device executes the identified function or displays the identified data.

Among the terms set forth herein, data refers to any kind of information processed by the device, including text and/or images received from any external entities, messages transmitted or received, and information created when a specific function is executed by the device.

Among the terms set forth herein, input module refers to an area, region, map, or portion of a screen displayed by a display device or unit.

FIG. 1 is a block diagram schematically illustrating a configuration of a terminal according to an exemplary embodiment of the present invention.

Referring to FIG. 1, the terminal 100 of the present invention may include a communication unit 110, an input unit 120, an audio processor 130, a display unit 140, a memory 150, and a controller 160. The terminal 100 supports landscape mode conversion and portrait mode conversion for displaying screens in a landscape format and in a portrait format, respectively, and for converting from the portrait format to the landscape format and for converting from the landscape format to the portrait format, respectively, and may further include various sensors, for example, an acceleration sensor, a gyro sensor, a geomagnetic sensor, and a switch for detecting the landscape mode conversion and portrait mode conversion.

As described herein, the terminal 100 may be oriented generally vertically or generally horizontally to be in portrait mode and landscape mode, respectively. In the description herein, examples are described of the terminal 100 changing from portrait mode to landscape mode, with display features adapted and changed accordingly, but it is to be understood that the terminal 100 may be in landscape mode and be changed to portrait mode, with display features adapted and changed accordingly, and that any change to either portrait or landscape mode is reversible.

The terminal 100 having the example construction or implementation described above supports operations and functionality such that various input modules 151 stored in the memory 150 are output on the display unit 140 according to preset schedule information or a user request. In this case, at least one of the input modules 151 is configured in the form of a touch map, that is, a region of a screen of the display unit 140, and may be output on a defined specific location of the screen of the display unit 140 according to a user setting. As described herein, outputting or displaying on the display unit 140 includes outputting information, data, and/or messages on at least one screen or window of the display unit 140. In particular, when gripping the terminal 100 by a hand in a specific direction, the input module 151 may be output on an optimized location of the display unit 140. Accordingly, the user may easily generate various input signals using an input module 151 output on a specific location of the display unit 140.

Meanwhile, a location optimized at a hand in a specific direction of the input module 151 output on the display unit 140 may be determined by various experiments. In more detail, the present invention has determined, from such experiments, that an area capable of operating a corresponding input module 151, in a state such that the input module 151 is output on the display unit 140, may be regarded as a length of a thumb finger of each user. For example, when a specific user grips the terminal 100 by a right hand, the user may operate the terminal by touching a specific location of an input module 151 output on the display unit 140 using a thumb finger in a state such that the user grips a side and a rear side of the terminal 100 by four fingers except for the thumb finger. In this case, the length of the thumb finger determines a selection range which allows a user to freely select specific locations of an input module 151 output on the display unit 140. Accordingly, the terminal 100 of the present invention may freely select various locations of an input module 151 in a state such that the user grips the terminal 100 by one hand by adjusting a location of the input module 151 according to the length of the thumb finger. For example, a length of a thumb finger of 95% of American women is about 5.58 cm. Accordingly, upon considering flexibility of a joint connecting a thumb finger, a range which can be touched by one hand may include, for example, the range from 5 cm. to 6 cm. Accordingly, when the terminal 100 has a display unit of 5 cm. to 6 cm. or greater, the user cannot handle a total display unit by one hand, and accordingly it is necessary to arrange a suitable input module.

Figure 2:
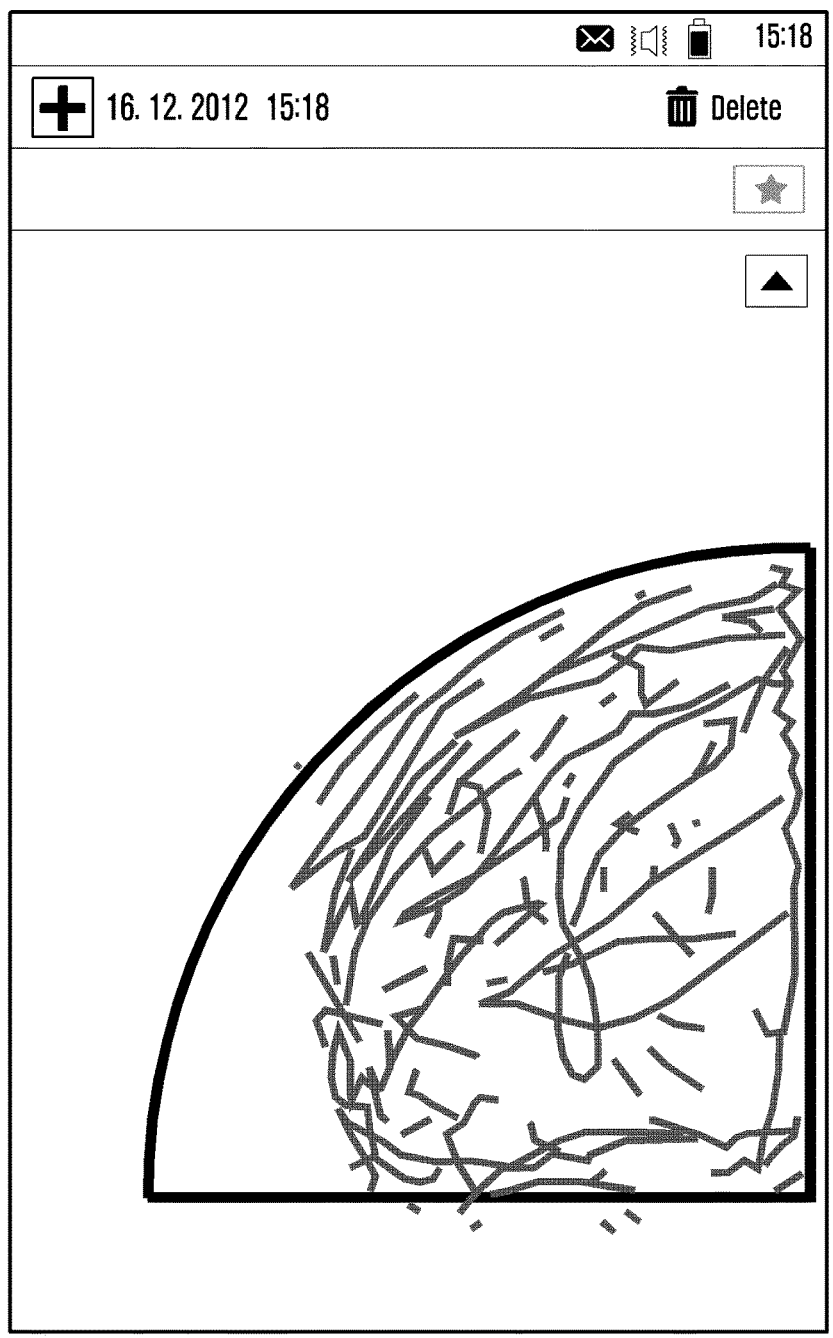
FIGS. 2 and 3 are diagrams illustrating a range which may be touched by a thumb finger of a user.
Figure 3:
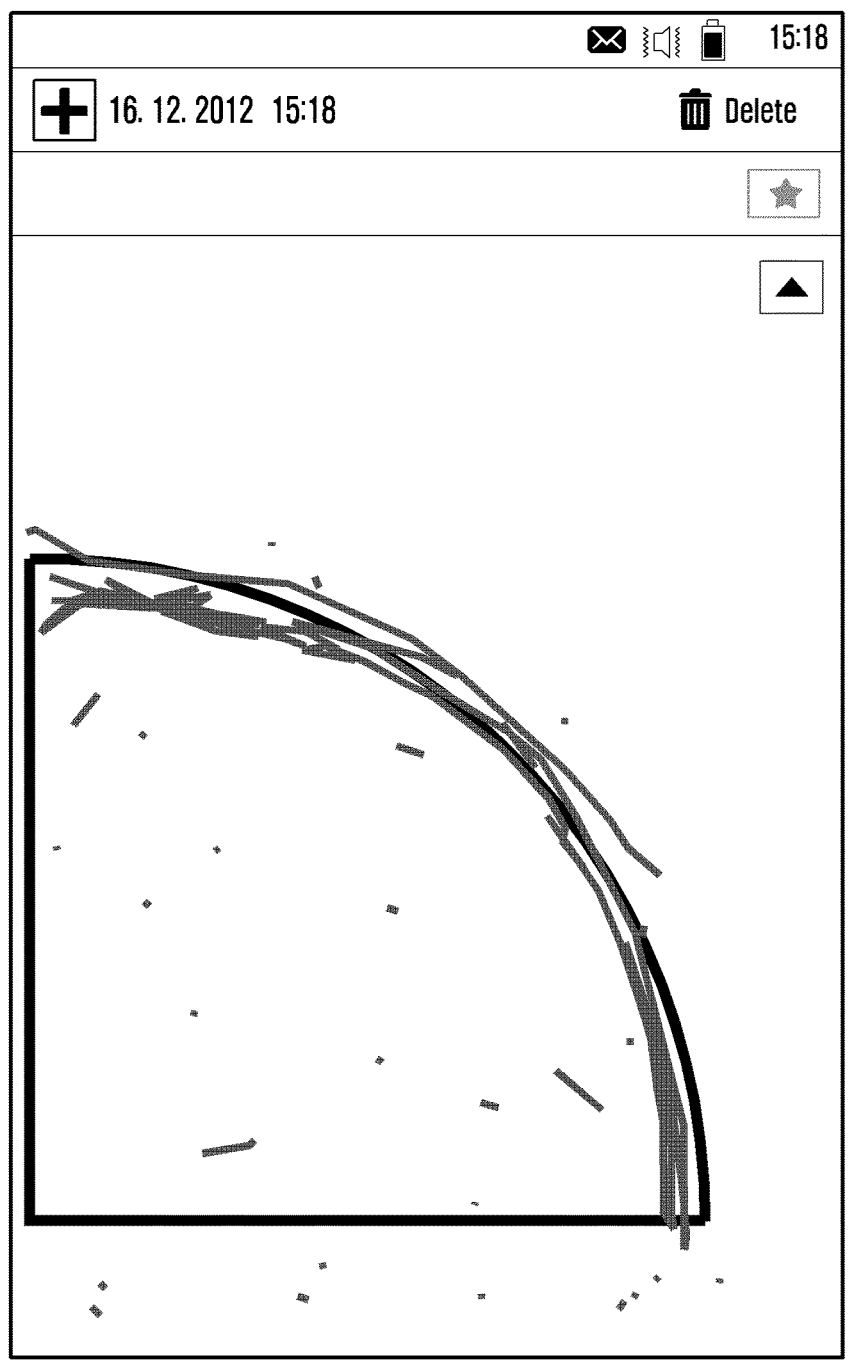

In the case of the present invention, the exemplary embodiment of the present invention is designed to arrange an input module 151 within a range which can be touched by one hand so that the user may freely and easily generate various input signals necessary to control the terminal 100 using the input module 151. In more detail, upon operating the terminal 100 using one hand, the terminal 100 has an operation range of a thumb finger as shown in FIGS. 2 and 3. That is, upon gripping the terminal 100 by a right hand, the user may have a touchable operation range represented by the quadrant of a circle, with squiggles representing touches and finger movements within the quadrant, as shown in FIG. 2. Upon gripping the terminal 100 by a left hand, the user may have a touchable operation range represented by the quadrant of a circle, with squiggles representing touches and finger movements within the quadrant, as shown in FIG. 3. The terminal 100 may output the input module 151 within the foregoing touchable operation range so that the user may easily generate an input signal without changing to gripping the terminal 100 by two hands or excessive change to a form for one hand.

Meanwhile, referring back to FIG. 1, the communication unit 110 supports a communication function of the terminal 100. The communication unit 110 may be included when the terminal 100 is manufactured, or may be added after manufacture, in any known form or implementation for supporting the communication function. Accordingly, when the terminal 100 according to the present invention does not support the communication function, the communication unit 110 may be omitted from a configuration of the terminal 100. In addition, the communication unit 110 may be provided in the form of a mobile communication module, known in the art, to support a communication function, and in particular, a mobile communication function of the terminal 100. The communication unit 110 forms a communication channel with a communication system or network, such as a mobile communication system, to support signal transception for executing a mobile communication function of the terminal 100. For example, the communication unit 110 may form at least one of a voice service channel, an image service channel, and a data service channel with the mobile communication system, and support transception of a specific signal according to a corresponding service channel.

The communication unit 110 may be activated according to a user request. In this case, various key maps and control maps for controlling the communication unit 110 may be output on the display unit 140. In particular, the communication unit 110 of the present invention may support various input modules according to control by the controller 160 for input of a phone number of another terminal in order to support the communication function. For example, the terminal 100 outputs an input module 151 configured by key maps for inputting numbers in the form biased to a hand of a specific direction, such as left or right for the corresponding hand, according to an operation of the communication unit 110. Here, biased information may signify a form where at least a predetermined ratio of an input module 151 may be disposed within a touchable range according to the length of a thumb finger among hands of a corresponding direction. According to the operation of the communication unit 110, the terminal 100 may output an item selectable list area, also referred to as a list region, configured by phone book information as the input module 151. In this case, the input module configured by the list region may be resized to a size within a range determined by a thumb finger in a direction of a hand gripping the terminal 100 as described above and the resized input module 151 may be provided. If a phone book information call event for operating the communication unit 110 is generated in a state such that one-hand operation mode of the present invention is set, the terminal 100 resizes the size of a phone book list screen set to be output on entire regions of the display unit 140, and may output the resized phone book list screen on a side of the display unit 140. In this case, the resized ratio may be defined suited to a location and a size according to a preset hand operation mode.

The input unit 120 generates various input signals necessary to operate the terminal 100. The input unit 120 may be configured to include various input devices and mechanisms known in the art, such as a keyboard, a keypad, and a key button according to compatibility of the terminal 100. When the display unit 140 includes a touch screen, the input unit 120 may be configured in the form of a touch map output on the touch screen. In particular, the input unit 120 of the present invention may be configured in various forms according to supporting various input modules. For example, the input unit 120 may be configured by the form of an input module 151 including at least one of various key maps such as a 3*4 key map, a 5*4 key map, a QWERTY key map, and a Dvorak key map. The input unit 120 may be configured in the form of an input module 151 including at least one of various control key maps such as a control key map for playing music, a control key map for playing a moving image, and a control key map for controlling a broadcast receiving function. The various key maps may have a size in a form for supporting one hand operation in a specific direction, an arranged structure of respective keys, and the size and an arranged structure in a form for supporting an operation except for the one hand mode. The foregoing key maps may be output on the display unit 140 as a specific size and an arranged structure according to the presence of a setting of the one-hand operation mode. The foregoing key maps may have a size for one-hand operation mode and an arranged structure of respective keys for supporting a left hand grip, and a size of one-hand operation mode and an arranged structure of respective keys for supporting a right hand grip.

The audio processor 130 may output various audio data set in an operation procedure of the terminal 100, audio data according to playback of an audio file stored in the memory 150, and audio data received from sources external to the terminal 100. The audio processor 130 may support an audio data collecting function. To this end, the audio processor 130 may include a speaker SPK and a microphone MIC. In particular, the audio processor 130 may output a sound effect or a guide sound according an operation of a corresponding input module 151 according to the present invention. For example, when a specific user function, to which a specific input module 151 is applied, is activated in a state such that the one-hand operation mode is set, the audio processor 130 may output a guide sound guiding a corresponding input module 151 depends on the one-hand operation mode, and a guide sound guiding the corresponding input module is an input module 151 corresponding to a hand in a specific direction. When an input signal for changing a direction is generated, that is, when an input signal for changing a mode from a left handed operation mode to a right handed operation mode, the audio processor 130 may output a sound effect according to generation of a corresponding input signal and a sound effect according to the change in the input module 151. When a specific key included in the input module 151 is selected according to generation of an event for controlling each input module 151, the audio processor 130 may output a sound effect according to key selection. Meanwhile, the output of the sound effect and the guide sound may be omitted according to a user setting or the intention of a designer or manufacturer of the terminal 100.

The display unit 140 provides various screen interfaces necessary to operate the terminal 100. For example, the display unit 140 supports an idle screen and a menu screen necessary to operate the terminal 100. The display unit 140 of the present invention may include a touch panel 143 and a display panel 141. The touch panel 143 may be the touch screen which may include or complement the input unit 120, as described herein, may have a size of a full screen of the display panel 141 or larger, and may be operated in a form of a full touch screen based on the display panel 141. The foregoing display unit 140 may provide a screen for setting a one-hand operation mode, a tutorial screen for training the user to use the one-hand operation mode, a screen output at an optimized location at a hand in a specific direction from various input modules 151 according to an operation of a signal, a screen in which a location of the input module 151 is changed according to input control, and a screen in which a location of the input module 151 is changed according to a change in the landscape mode or the portrait mode. The respective screens will be described in more detail with reference to the following drawings.

The memory 150 may store various basic operating systems necessary to operate the terminal 100, data, settings, or an application, and an algorithm or method corresponding to various user functions. In particular, the memory 150 may include various input modules 151 supporting an operation of an input area output on the display unit 140 of the present invention, and an input support program 153 supporting output functions and an operation of the input module 151.

Each of the at least one input modules 151 may be configured by various key maps which may be supported by the terminal 100. For example, the input module 151 may include key maps for inputting numbers, key maps for inputting characters, and control key maps for controlling functions. The key map for inputting numbers may include a key map such as a key map for inputting a phone number, a calculator key map for a mathematical or engineering calculation, and a key map for inputting dates for supporting various functions associated with the numbers, such as a calendar function. The key maps for inputting characters may include a key map for inputting English characters, a key map for inputting Korean characters, a key map for inputting characters corresponding to various national languages such as the Chinese and Japanese languages, and a key map for inputting special characters. The control key maps for controlling functions may include various control key maps such as a control key map for controlling playback of music, a control key map for controlling playback of a moving image, and a control key map for controlling a broadcast receiving function. The input module 151 may include a basic form in which the foregoing key maps are output on the display unit 140 to have a defined size and location, and at least one of a left hand mode support form and a right mode support form for supporting one-hand operation mode of the present invention. The input module 151 of the basic form may have an array form of keys symmetrical to each other based on the center of the display unit 140, or an array form of at least one key which is arrayed at a central region of the display unit 140.

Figure 7:
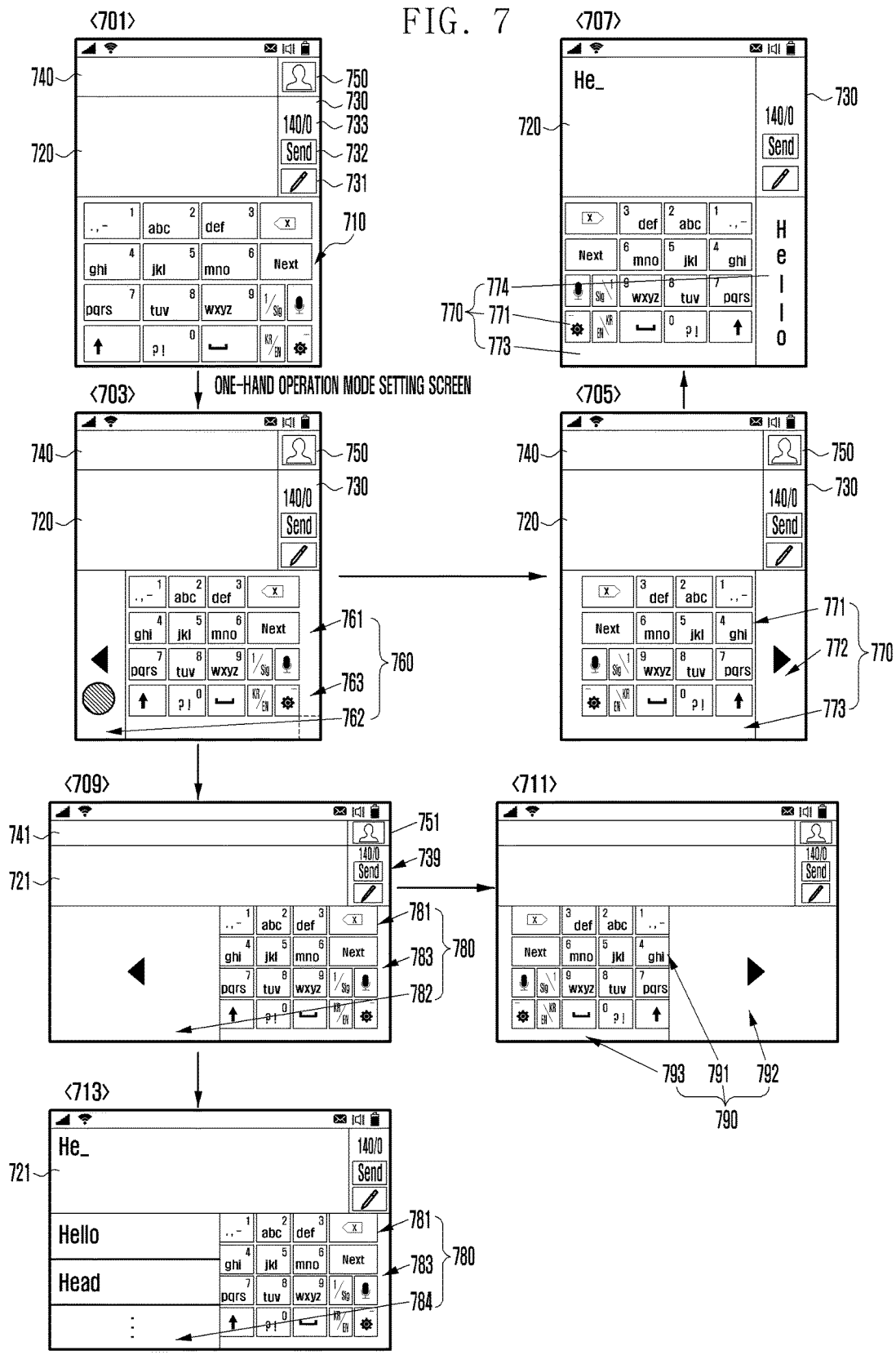
FIG. 7 is a diagram illustrating an one-hand operation mode of a 3*4 keypad according to the exemplary embodiment of the present invention.

Meanwhile, the input module 151 may include only key maps corresponding to the basic form, such as the screen 701 shown in FIG. 7. Then, if an activation request of a specific user function is generated, the controller 160 may confirm classification setting information according to operation of a one hand mode, a left hand mode, or a right hand mode, resize at least one of a size, a location, and a form of an input module 151 of the basic form, or vary the arrangement of keys to generate and store at least one of a right hand input module and a left hand input module. When the right hand input mode and the left hand input mode is requested, the controller 160 may generate and output the right hand input module and the left hand input module, respectively, based on an input module 151 of a basic form when a corresponding request is generated.

The input support program 153 may include various routines necessary to support the one-hand operation mode of the present invention. For example, the input support program 153 may include a routine of supporting a one-hand operation mode setting, a routine of calling or requesting display of an input module 151 corresponding to a user function when a specific user function to which the one-hand operation mode is set is activated, and a routine of outputting the called or requested input module 151 on the display unit 140 to be biased to be displayed in a defined predetermined direction, such as left or right. The input support program 153 may include a routine supporting operations such that an output direction of the input module 151 is changed, a routine of adjusting an arranged structure or the size of keys when an output direction of the input module 151 is changed, and a routine processing a specific input signal according to an event generated from a corresponding input module 151. Further, the input support program 153 may include a routine for collecting one hand operation within a possible range of a user to adjust the size of the input module 151 and an array of keys.

The controller 160 controls the transfer and processing of signals and supply and distribution of power required to operate an input area or input module 151 output on the display unit 140 according to the exemplary embodiment of the present invention. For example, the controller 160 may adjust at least one of a form and a location of the input module 151 according to a user request or a preset schedule after output of the input area, and control a user function according to a signal input through the input module 151. The controller 160 may include example constituent elements as illustrated in FIG. 4.

Figure 4:
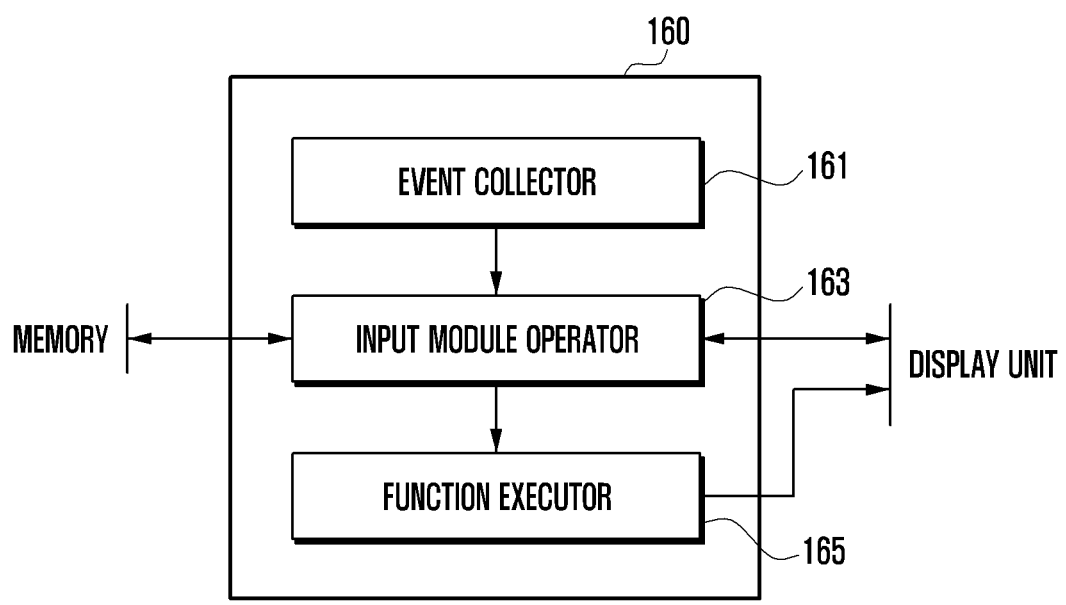
FIG. 4 is a block diagram illustrating a configuration of a controller of the terminal according to the exemplary embodiment of the present invention in more detail.

FIG. 4 is a block diagram illustrating a configuration of a controller 160 of the terminal 100 according to the exemplary embodiment of the present invention in more detail.

Referring to FIG. 4, the controller 160 of the present invention may include an event collector 161, an input module operator 163, and a function executor 165.

The event collector 161 collects various events generated from the terminal 100, such as touch events on the touch screen and/or touch panel 143, and transfers a specific event among the collected events to the input module operator 163. In more detail, when an event for calling, requesting, or activating a specific user function requiring output of the input area or input module 151 is generated on a display region, the event collector 161 may transfer preset information indicating the presence of a setting for the one-hand operation mode to the input module operator 163. As described above, when receiving an input signal for activating a specific user function requiring the output of the input module 151, the event collector 161 generates input module selection information corresponding to the received input signal. The event collector 161 may confirm stored preset information in order to confirm a setting state of one-hand operation mode. To this end, the terminal 100 may store preset information indicating the presence of a setting for the one-hand operation mode with respect to a specific user function according to a user setting.

The input module operator 163 receives input module selection information and preset one-hand operation mode information, and supports output of a specific input module 151 based on corresponding information. To this end, the input module operator 163 may perform a procedure of confirming various input modules 151 stored in the memory 150 based on the input module selection information. The input module operator 163 confirms the preset one-hand operation mode information. When the one-hand operation mode is set, the input module operator 163 may call or request an input module 151 for supporting the one-hand operation mode, and output the called or requested input module 151 on a previous defined location of the display unit 140. The input module operator 163 may resize an input module 151 provided in an existing form according to a setting of the one-hand operation mode, and output the resized input module 151 on the display unit 140.

The input module operator 163 may output a changed item supporting the change in a location of the input module 151. If an input signal for selecting a corresponding change item is generated, the input module operator 163 may convert a form of the output or displayed input module 151 from a left mode to a right mode or from the right mode to the left mode.

In addition, the input module operator 163 may detect rotation of the terminal 100 using various sensors, for example, an acceleration sensor, a gyro sensor, a geomagnetic sensor, and a switch, and may change at least one of a location and a form of the input module 151 output according to the rotation of the terminal 100. For example, when a rotation state of the terminal is converted from a portrait mode to a landscape mode, the input module operator 163 may resize the input module 151 output in a hand mode in a specific direction suited to a region of the display unit 140 according to corresponding rotation change or adjust locations of respective keys. In this case, the input module 151 stored in the memory 150 includes forms corresponding to the landscape mode and the portrait mode, respectively, and the input module operator 163 may control operations such that the input module 151 corresponding to a one-hand mode in a specific direction is output according to the conversion of the landscape mode and the portrait mode.

If a specific input signal is generated from an input module 151 output by the input module operator 163, the function executor 165 controls operations such that a function according to the corresponding input signal is executed. For example, if a dialing input signal is generated together with input of a specific phone number after the input module 151 having a phone number input and dialing function is output on the display unit 140, the function executor 165 may process and transfer a signal for call connection with another terminal corresponding to the phone number. In this case, the function executor 165 may output additional information associated with an operation of a corresponding input module 151 on a predetermined area of the display unit 140 to which the input module 151 is output. In particular, the function executor 165 may output additional information on a blank area on which keys included in the input module 151 are not displayed.

If a user function for creating a message through input of characters or numbers and a corresponding input module 151 is output, the function executor 165 outputs signals input by the input module 151 on an output area of the display unit 140. The function executor 165 may control operations such that a corresponding message is transmitted to another terminal according to an additional input signal. If a specific input signal is generated according to a corresponding control key map in a state such that the input module 151 corresponding to the control key map is output on a side of a screen of the display unit 140, the function executor 165 may control a user function according to the corresponding input signal. For example, a control key map for selecting a channel may be output on an area of the display unit 140 as the input module 151 according to execution of a broadcast receiving function. If a specific input signal is generated from the input module 151 in this state, the function executor 165 may execute user functions including changing a broadcasting channel, terminating a broadcast receiving function, or recording broadcasting according to a corresponding input signal.

As described above, the terminal 100 of the present invention may provide a form of the input module 151 on the display unit 140 in a biased form in a predetermined direction in order to support an operation of one hand of the user in a procedure of outputting or displaying various input modules 151 according to the user function. Accordingly, the user may control various inputs using one hand without performing a separate operation during a procedure of operating the input module 151. The terminal 100 provides a change item capable of directly calling or requesting an input module 151 according to a corresponding environment in response to a grip change of a left hand, a right hand, or both hands during a procedure of operating the terminal 100 to easily operate the terminal 100 without trouble or difficulty such as for menu selection for selecting the input module 151.

Figure 5:
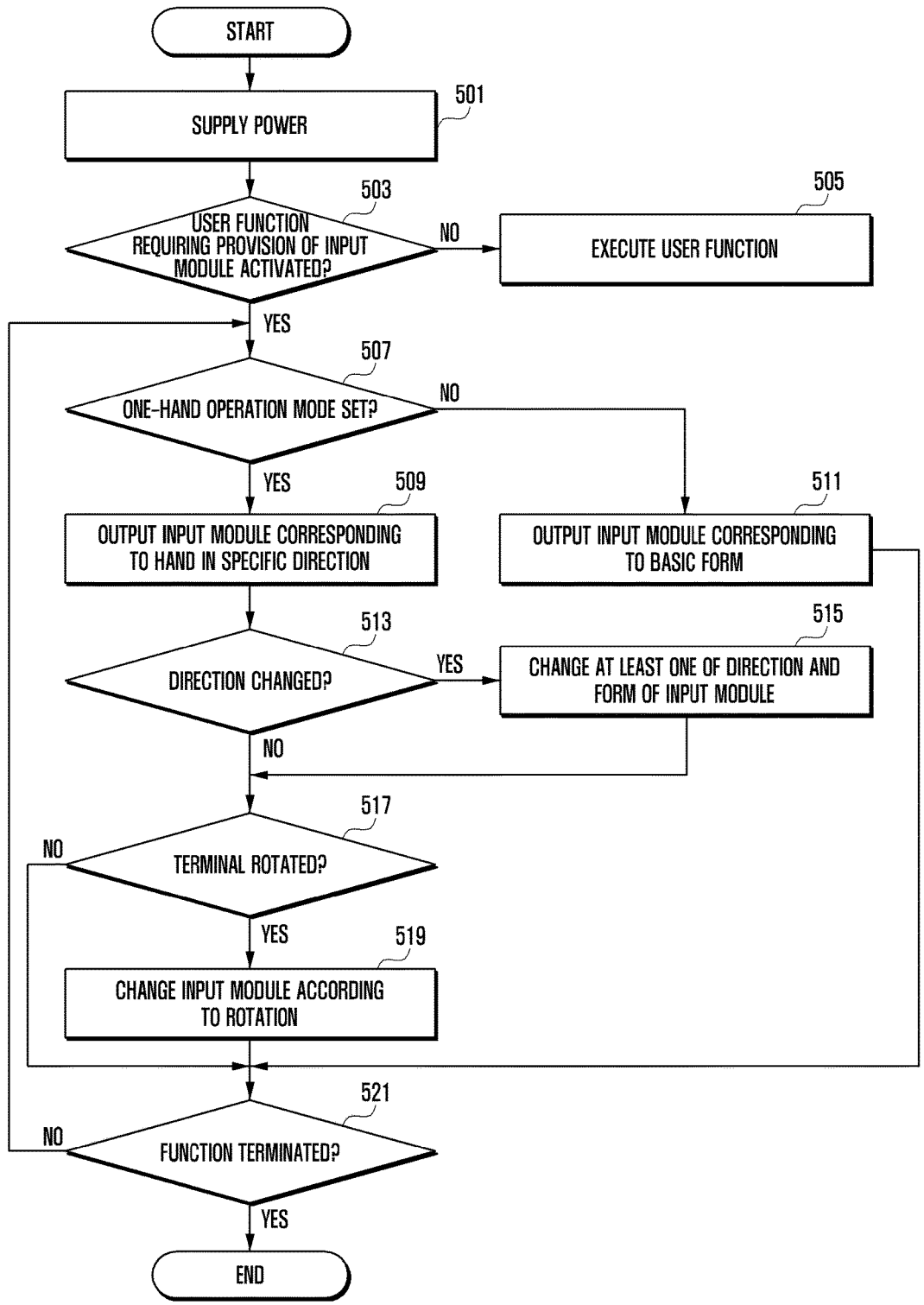
FIG. 5 is a flowchart illustrating a method of operating an input area or input module output on a display region according to the exemplary embodiment of the present invention.

FIG. 5 is a flowchart illustrating a method of operating an input area or input module 151 output on a display region according to the exemplary embodiment of the present invention.

Referring to FIG. 5, a controller 160 of the terminal 100 may supply power to support a specific function of the terminal 100, for example, at least one function or state such as an idle screen function, a sleep state support function, and a specific terminal function operation state in step 501. To this end, the controller 160 may control operations such that power from a battery or an adapter is conveyed to a specific element of the terminal 100.

Meanwhile, the controller 160 may determine whether an input signal for activating a user function requiring provision of an input module 151 is generated according to the exemplary embodiment of the present invention in step 503. When the input signal for activating a user function requiring provision of an input module 151 is not generated in step 503, the controller 160 may control and process signals for executing a corresponding user function in step 505. For example, when an input signal for executing a function without requiring a specific key map such as a menu screen search function is generated, the controller 160 may control execution of a function according to a corresponding input signal.

However, in step 503, when the input signal for activating a user function requiring provision of an input module 151 is generated, the controller 160 may determine whether preset information for setting one-hand operation mode is generated in step 507. When the one-hand operation mode is not set in step 507, the controller 160 may output an input module corresponding to a basic form on the display unit 140 in step 511 and proceed to step 521. The basic form may have a predetermined size and area, and have a structure and format which is positioned at the center of the screen on the display unit 140, such as screen 701 in FIG. 7. The basic form may be configured by a key map in a previously defined form in order to support a specific user function regardless of the presence of one hand operation by a left hand or a right hand.

Referring back to step 507, when the one-hand operation mode is set at step 507, the controller 160 may output an input module 151 corresponding to a hand in a specific direction on the display unit 140 in step 509. For example, the controller 160 may output an input module 151 where a key map is biased to a right side of the screen of the display unit 140, so that one-hand operation by the right hand is possible. The controller 160 may also control operations such that an input module 151 supporting a left handed operation is output. The input module 151 supporting a right handed operation or a left handed operation may be an input module 151 for supporting a hand in a direction which is defined according to preset default information, which is directed as set by the user, or which is finally selected and operated due to an operation of a corresponding user function. The controller 160 may change a form of an output or displayed input module 151 according to a current display format or form of arrangement of displayed elements on a screen of the display unit 140 of the terminal 100, that is, the arrangement of a landscape mode or a portrait mode. To this end, the terminal 100 may store an input module 151 differently created according to an arranged state of the landscape mode or the portrait mode, or may adjust or output an input module 151 of a basic form suited to the landscape mode or the portrait mode. The terminal 100 may have previously stored information regarding a location of the input module 151 and arranged states of the keys for operating one-hand mode according to an arranged state of the landscape mode or the portrait mode in order to adjust the input module 151 of a basic form, and may output an input module 151 of a specific arranged state for one-hand operation based on the stored information.

After step 509, the controller 160 may determine whether a direction change signal for changing a direction of a left hand or a right hand is generated in step 513. To this end, the user may generate an input signal selecting a direction change menu item allocated to change the direction of the screen of the display unit 140 for the left hand or the right hand. If a direction change is detected in step 513, the controller 160 generates the input signal for changing the direction so that at least one of a direction and a form of the input module 151 is changed in step 515, and the method proceeds to step 517. For example, when the input signal for changing the direction is generated in a state that an input module 151 for supporting a left handed operation is output, the controller 160 may control operations such that an input module 151 for supporting a right handed operation is output. In this case, the controller 160 may select and output an input module 151 for supporting a previously defined right handed operation from the memory 150, adjust the size of a basic form, and arranged locations of respective keys to generate an input module 151 for supporting a right handed operation, and output the generated input module 151 on the display unit 140.

However, in step 513, if the input signal for changing the direction is not generated, that is, when an output of a current input module maintains the direction or orientation at step 513, the process proceeds to step 517. The controller 160 determines whether a signal for rotating the terminal is generated in step 517. That is, the controller 160 may determine whether a sensor signal according to conversion from the landscape mode to the portrait mode or from the portrait mode to the landscape mode is generated. When the signal for rotating the terminal 100 is generated as detected in step 517, the controller 160 may change the input module 151 according to the rotation of the terminal in step 519. That is, if a rotation sensing signal for changing arrangement in a state such that a current input mode is output in the portrait mode, the controller 160 may convert an environment of a display unit 140 of the terminal 100 from the portrait mode to the landscape mode, and output an input module 151 of a user function corresponding to the landscape mode. During this procedure, the controller 160 may select and output an input module 151 associated with a corresponding user function previously stored in the memory 150, resize a basic form suited to the one-hand operation of the landscape mode or adjust a key arrangement of a key map, or output the resized basic form or the adjusted key arrangement of the key map. However, in step 517, when the direction change signal for changing a direction is not generated at step 513 or the signal for rotating the terminal 100 is not generated, the controller 160 may control operations such that step 519 is skipped, and the method proceeds to step 521.

In step 521, the controller 160 determines whether an input signal for terminating a function is generated. When the input signal for terminating a function is not generated, the controller 160 returns to step 507 and repeats the foregoing procedures. Otherwise, the method of FIG. 5 ends.

As describe above, the method of operating an input module 151 displayed on a display area of the present invention outputs an input module 151 which can be operated by one hand, such as either a left hand or a right hand on the display unit 140 according to the presence of a setting for the one-hand operation mode when a user function requiring an input module 151 is activated. In this case, the method may output an input module 151 applied to the landscape mode or the portrait mode according to an arranged state of the terminal 100. The method may change a location of an input module 151 and an arranged state of at least one of keys according to a direction change request from a left hand to a right hand or from the right hand to the left hand. The method may change at least one of the location and the form of the input module 151 according to an arrangement change from the landscape mode to the portrait mode of from the portrait mode to the landscape mode.

Figure 6:
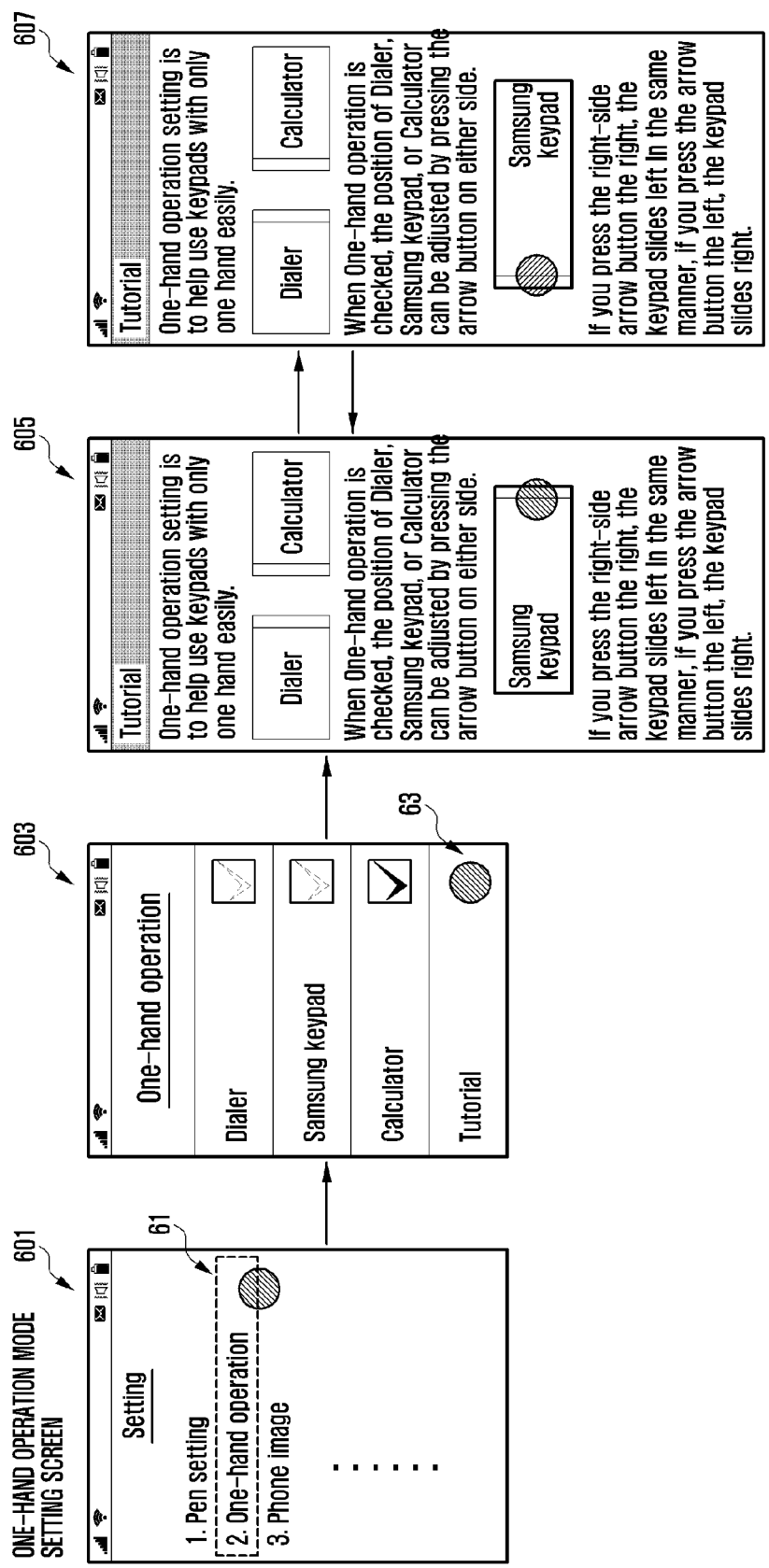
FIG. 6 is a diagram illustrating an example of a screen interface for setting one-hand operation mode according to the exemplary embodiment of the present invention.

FIG. 6 is a diagram illustrating an example of a screen interface for setting one-hand operation mode according to the exemplary embodiment of the present invention.

Referring to FIG. 6, if an input signal for calling or requesting a "setting" screen associated with function for setting of the terminal 100 is generated from the input unit 120 or the display unit 140 by a touch function, the controller 160 may output the "setting" screen 601 on a display unit 140. In particular, the display unit 140 may output a screen interface including an item or icon 61 for setting one-hand operation mode of the present invention.

If a user generates an input signal by selecting an item 61 for one-hand operation mode setting on the screen 601, the controller 160 may output a screen interface 603 associated with the one-hand operation mode setting on the display unit 140. In this case, a preset one-hand operation mode screen interface 603 may include items such as icons and other known display elements associated with a specific input module 151. For example, such displayed items may be a dialer, a keypad, or a calculator. When a specific input module 151 is set to be operated in the one-hand operation mode according to the one-hand operation mode setting, specific user functions using respective input modules 151 may be collectively set in the one-hand operation mode.

Meanwhile, the various displayed items on the screen interface 603 may be items associated with a user function. That is, the various items may include or may be associated with specific user functions such as a message creation function, a chatting function, an e-mail creation function, a telephone or communications call function, a calculator function, and a household account book function supported by the terminal 100. The user may select a specific input module 151 or a check box, such as the displayed check boxes in the screen interface 603, so that the one-hand operation mode setting with respect to a user function item may be performed.

In addition, the one-hand operation mode setting screen interface may provide a "tutorial" item 63 for performing the one-hand operation mode of selecting a tutorial to be performed, as shown in the screen interface 603. When the user selects the tutorial item 63, the display unit 140 may output information supporting a location change of the input module in the one-hand operation mode as illustrated in screens 605 and 607 of FIG. 6, with the greyed circles representing selected regions for activating a corresponding function, such as displaying a SAMSUNG keypad oriented with keys having a predetermined arrangement, such as keys for products displaying such a keypad commercially available from SAMSUNG ELECTRONICS CO., LTD.

FIG. 7 is a diagram illustrating a one-hand operation mode of a 3*4 keypad according to the exemplary embodiment of the present invention.

Referring to FIG. 7, when the one-hand operation mode is not set, the terminal 100 may output a screen including a 3*4 key map region corresponding to an input module of a basic form on the display unit 140 as illustrated in the screen 701. For example, a screen interface output on the screen 701 may be a message creation screen, an e-mail creation screen, and a chatting screen. The input module 710 of a basic form may be output in a predetermined area of the display unit 140 with a previously defined size and form. For example, the input module 710 of a basic form may have a symmetrical structure based on a vertical center line of the display unit 140. That is, the input module 710 having the basic form is centered on the screen of the display unit 140. In addition, a screen interface of the screen 701 may be provided with an output area 720 on which a character may be input corresponding to an input signal input according to control of a corresponding input module except for an area of the input module 710 of the basic form. The screen interface 701 may include additional areas, for example, a function item area 730 on which specific function items associated with a corresponding user function are output as well as the output area 720. The function item area 730 may include a function item 731 supporting conversion to a pen function, a function item 732 for transmitting a created message, and an item 733 providing information regarding a total amount of a creatable message and an amount of a currently created message. The screen 701 may include an information input area 740 for inputting information of another terminal which will receive the message and a phone book call area 750 supporting a phone book or contacts for selecting the other terminal. The user may create and transmit the message generated in the output area 720 based on the screen interface 701.

Meanwhile, when the user has set the one-hand operation mode, the terminal 100 may output an input module 151 for supporting the one-hand operation mode in a specific direction on the display unit 140 as illustrated in a screen 703. For example, the terminal 100 may output a right hand input module 760 for supporting a right hand based one-hand operation mode. The right hand input module 760 may include a right hand key map area 761, a first change item area 762, and a first blank area 763. The right hand input module 760 provided on the screen 703 may be configured by a virtual key map provided in a state such that the terminal 100 is arranged in the portrait mode.

The right hand key map area 761 may have the same arrangement of keys as that of the input module 710 of a basic form shown in the screen 701, while the respective keys of the screen 703 may be biased toward a right periphery of the screen 703. Accordingly, the right hand key map area 761 may be biased to a right side while maintaining a rectangular shape. The sizes of a location and an area to which the right hand key map area 761 is output, and an arranged location of keys may be adjusted within a one-hand operable distance of the user. To this end, the terminal 100 may provide the right hand key map area 761 based on a length of a thumb finger of the user provided as a default, and provide the right hand key map area 761 based on the length of the thumb finger input by the user. The display of the right hand key map area 761 based on the length of the thumb finger of the user will be described with reference to following drawings.

As shown in the screen 703 in FIG. 7, the first change item area 762 may be arranged at a left peripheral region of the right hand key map area 761. Accordingly, when the user grips the terminal 100 by a left hand, the first change item area 762 may be easily selected, with the greyed circle representing selecting and activating the first change item area 762. In the case of selecting the first change item area 762, the terminal 100 may provide a screen to which the left hand input module 770 including the left hand key map area 771 is outputted as illustrated in a screen 705.

Referring to screen 703, the first blank area 763 is provided at a right and bottom periphery of the right hand key map area 761 so that the user may easily select respective keys included in the right hand key map area 761 by the right hand. When the user tries to grip the terminal 100 by the right hand, the user selects keys of the right hand key map area 761 using a thumb finger. In this case, an area neighboring a right periphery according to a bent angle of the thumb finger may be an area difficult to select by the thumb finger. Since the thumb finger is spaced apart from a bottom end of the terminal 100 by a predetermined distance in a state such that a palm grips a bottom of the terminal 100, that is, a bottom portion relative to the vertical direction of the screens 701-711 on the display unit 140, the thumb finger may not select such a bottom part of the terminal 100. Accordingly, the first blank area 763 is arranged at an area corresponding to an area which the thumb finger may not select so that the right hand key map area 761 of the terminal 100 may be easily selected by the thumb finger. The first blank area 763 may be initially provided in a default location, and may be adjusted in size and shape according to a specific length of the thumb finger. The terminal 100 according to the present invention may initially provide the first blank area 763 suited to an average length of the thumb finger, and may adjust the size and location of the first blank area 763 according to measurement and input of the length of the thumb finger of the user. Meanwhile, the screen interface 703 may be supported so that an output area 720, a function item area 730, an information input area 740, and a phone book call area 750 maintain their orientations, sizes, and/or appearances from a previous screen state.

As described above, when the user selects the first change item area 762 in a state in which the screen 703 is displayed, the terminal 100 may output a screen interface as illustrated in the screen 705. The screen interface 705 may have substantially the same screen structure as that of the screen interface 703, but instead the input module area is output as a left hand input module 770 of a form specified at the left hand. As shown in the screen interface 705 of FIG. 7, the left input module 770 may include a left hand key map area 771, a second change item area 772, and a second blank area 773.

The left hand key map 771 has a size similar to that of the right hand key map area 761 of the screen 703, but a display location of a key map in the left hand key map area 771 may be different from that in the right hand key map area 761. Further, arranged locations and directions of keys displayed on the left hand key map area 771 may be different from those on the right hand key map area 761 as shown. The left key map area 771 may have the same arranged location of keys as those displayed on the right hand key map area 761. The second change item area 772 is an area for activating conversion back to the screen 703 to which the right hand input module 760 is output. The second blank area 773 may be an area corresponding to an area which the left thumb cannot select so the left hand key map area 771 may be easily selected by a left hand of the user.

If the user selects keys of the left hand key map area 771 to input characters in a state shown in the screen interface 705, the terminal 100 may output characters of keys according to selection on an output area 720. In this case, the function item area 730 may maintain the configuration of similar or identical icons or display elements on the screen interface 705 as in screens 701 and 703. Meanwhile, when character input occurs, an information input area 740 and a phone book call area 750, to which information regarding another terminal is input, may be removed from being displayed on the screens 701-705 of the display unit 140, as shown in screen 707, for example, by a predetermined input command. When an input signal for completing message creation is generated or the character input is not generated for a preset time, the information input area 740 and the phone book call area 750 may be again output as in the screen interface 705. The controller 160 may automatically control resizing of the output area 720 and the function item area 730 for removal and for output on screens of the information input area 740 and the phone book call area 750.

Meanwhile, referring to screen 705, when character input by the left hand key map area 771 occurs, the controller 160 may change the second change item area 772 to an additional information output area 774, as shown in the screen 707. The additional information output area 774 may display previously stored specific information associated with the character input. For example, a word output according to a word recommendation associated with characters input by the user, such as by auto-correct functions known in the art, may be performed on the additional information output area 774, as shown in the screen 707.

Referring back to the screen 703, when an arranged state of the terminal 100 is in the state of the screen 703, for example, and when rotation where the terminal 100 is converted from the portrait mode to the landscape mode is achieved, the terminal 100 may output a screen interface for supporting the landscape mode on the display unit 140 as illustrated in a screen 709. A right input module 780 based on the landscape mode is output to the screen interface in screen 709 for supporting the landscape mode, and an output area 721 based on the landscape mode, a function item area 739, an information input area 741, and a phone book call area 751 may be provided on the screen interface of screen 709. The right hand input module 780 based on the landscape mode may include a right hand key map area 781 based on the landscape mode, a first blank area 783 based on the landscape mode, and a first change item area 782 based on the landscape mode. The right hand key map area 781 based on the landscape mode may have an arrangement of the same keys as those of the right hand key map area 761 of screen 703, but which have been adjusted size and location. The right hand key map area 781 based on the landscape mode may be biased to a right periphery so that that the user may select keys by a right hand in a state of gripping the terminal 100. The first change item area 782 based on the landscape mode may have an area larger than the corresponding change item areas 762, 772 of the portrait mode. The first blank area 783 based on the landscape mode may be formed at a right periphery and a bottom periphery of the right hand key map area 781 based on the landscape mode, with each of the right periphery and the bottom periphery having a predetermined width.

Meanwhile, when the first change item area 782 based on the landscape mode is selected, a left input module 790 based on the landscape mode may be output on the display unit 140 as illustrated in a screen 711. A left hand key map area 791 may be biased to a left side of the left input module 790 based on the landscape mode. In this case, the left hand key map area 791 has a form similar to that of the right hand key map area 781 based on the landscape mode in screen 709. A second change item area 792 based on a landscape mode may be output to a right side of the left hand key map area 791 based on the landscape mode. A second blank area 793 based on the landscape mode may be formed at a left periphery and a bottom periphery of the left hand key map area 791 based on the landscape mode, with each of the left periphery and the bottom periphery having a predetermined width. When the second change item area 792 based on the second landscape mode is selected, the terminal 100 may return to the screen 709.

Referring back to screen 709, when the user selects at least one of the keys of the right hand key map area 781 on the screen 709 based on the landscape mode to perform character input in a state of the screen interface 709, the controller 160 may output a corresponding character to the output area 721 as illustrated in a screen 713 in FIG. 7. The first change item area 782 based on the landscape mode in the right hand input module based on the landscape mode may be converted into an additional information output area 784 based on the landscape mode in the screen 713. The additional information output area 784 based on the landscape mode may be an area in which recommended words associated with an input character are displayed, providing an auto-correct function known in the art, and a plurality of additional information output areas may be output. The additional information output area function is equally applicable to the left hand input module 790 based on the landscape mode shown in screen 711.

Figure 8:
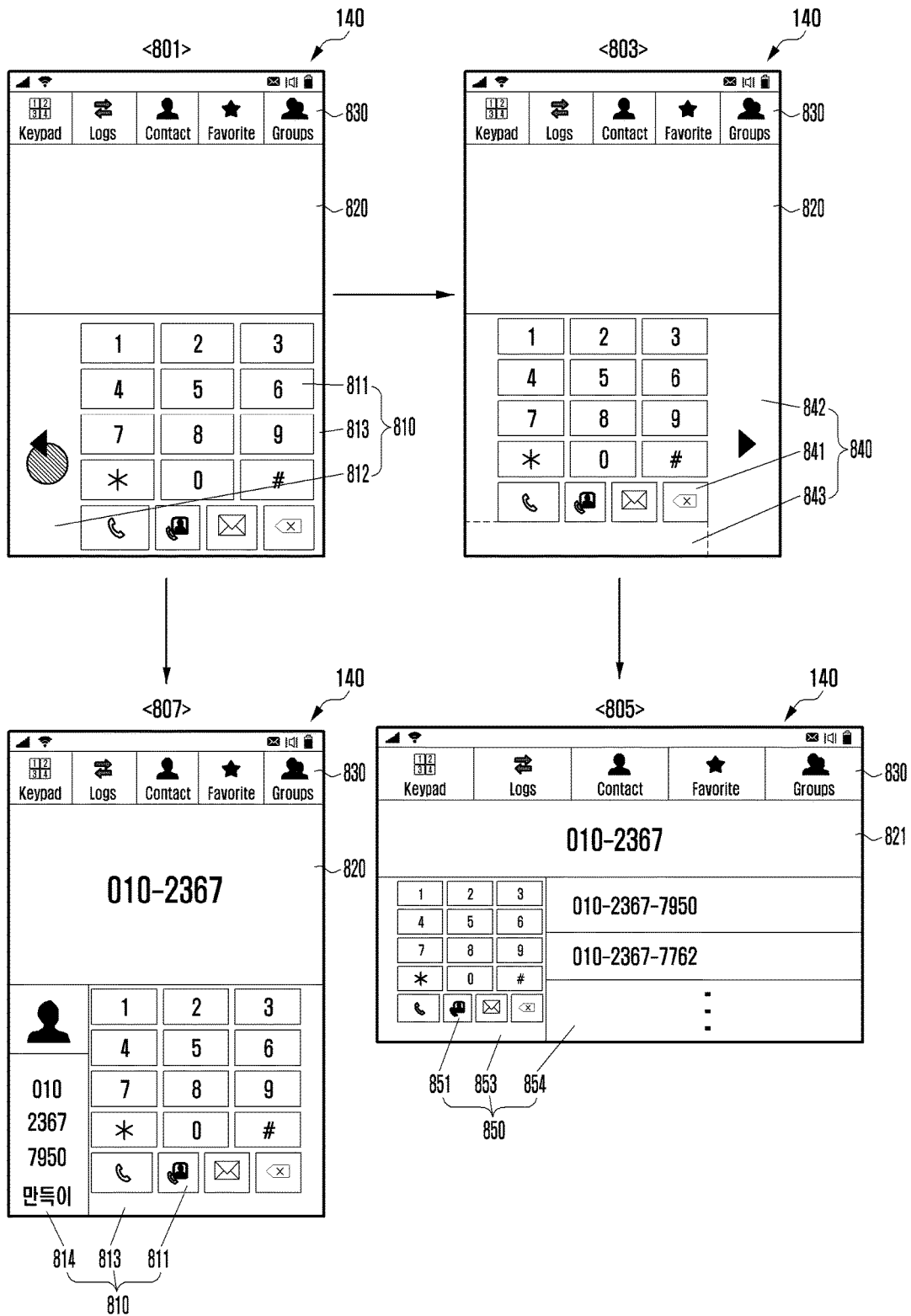
FIG. 8 is a diagram illustrating a screen interface regarding a dialer operation during the one-hand operation mode according to the exemplary embodiment of the present invention.

FIG. 8 is a diagram illustrating a screen interface regarding a dialer operation during the one-hand operation mode according to the exemplary embodiment of the present invention.

Referring to FIG. 8, if an input signal for activating a user function for displaying a dialer for calling another terminal is generated in a set state of the one-hand operation mode, the terminal 100 of the present invention may output a right hand input module 810 which is an input module biased to a right side of a key map area associated with a dialer, which is biased based on a central line of a screen 801 displayed on the display unit 140. The terminal 100 may output a left hand input module 840 in which an input module is biased to a left side based on the central line of a screen 803 displayed on the display unit 140 according to an user setting or an intention of a designer or manufacturer of the terminal 100. When the one-hand operation mode is not set, the terminal 100 may have a structure in which a dialer including a plurality of keys is symmetrical based on the center of the currently displayed screen of the display unit 140, and may output a corresponding screen.

A dialer support user function provided from the screen interface 801 may be a call function. As shown in the screen 801, the call function support screen may include a right hand input module 810, an output area 820, and a menu area 830. The output area 820 may be an area to which numbers selected from the right hand key map area 811 included in the right hand input module 810 are output. The menu area 830 may be an area to which items associated with the call function are output. The right hand input module 810 may include the right hand map area 811 biased to a right side based on a vertical center line of the display unit 140, a first change item area 812 arranged at a left side of the right hand key map area 811, and a first blank area 813 arranged at a right periphery and a bottom periphery of the right key map area 811.

When the user generates an input signal selecting a first change item area 812, the terminal 100 may provide a screen interface including a left hand input module as illustrated in the screen 803. The left input module 840 may include a left hand key map area 841 biased to a left side, a second change item area 842 arranged at a right side of the left key map area 841, and a second blank area 843 formed at a right periphery and a bottom periphery of the left key map area 841, with each of the right periphery and the bottom periphery having a predetermined width.

Meanwhile, when the user rotates the terminal 100 in the landscape mode in a state such that the screen 803 is displayed, the terminal 100 may display a screen to which a left hand input module 850 based on the landscape mode is output as illustrated in a screen 805 of FIG. 8. The left hand input module 850 based on the landscape mode, an output area 821 based on the landscape mode, and a menu area 831 based on the landscape mode may be provided on the screen interface 805.

The left hand input module 850 based on the landscape mode may include the left hand key map area 851, a blank area 853 based on the landscape mode, and a change item area 854 based on the landscape mode. The blank area 853 is formed at a left periphery and a bottom periphery of the left hand input module 850, with each of the left periphery and the bottom periphery having a predetermined width.

When the user input numbers to the screen 805 using specific keys of the left hand key map area 851 based on the landscape mode, the change item area 854 based on the landscape mode may be converted into an additional information output area 854 based on the landscape mode. The additional information output area 854 based on the landscape mode may be an information area recommending a specific phone number associated with a corresponding number upon input of the beginning portions of the number. The specific phone number may be information previously stored in a phone book or information included in a call history. The additional information output area 854 based on the landscape mode may provide at least one related phone number.

Referring back to screen 801, when the user selects a specific key of the right hand key map area 811, for example, by selecting the first change item area 812 represented by the greyed circle, to input numbers in a state of the screen 801, the right hand input module 810 including the additional information output area 814 may be output as illustrated in a screen 807. The information output on the additional information output region 814 may be a specific phone number stored in the phone book or a specific phone number having a call history as illustrated in the screen 805.

Figure 9:
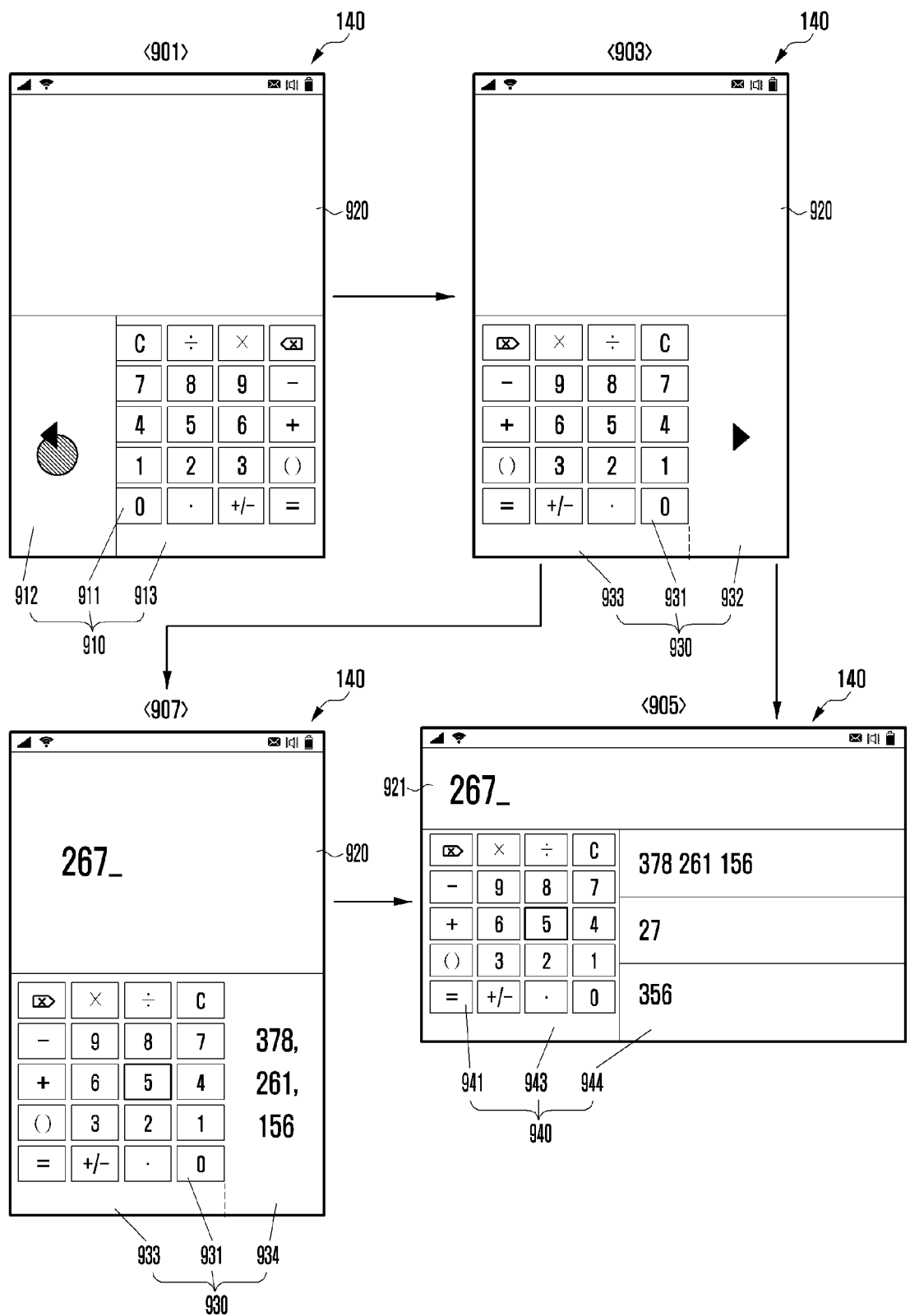
FIG. 9 is a diagram illustrating supporting a calculator function during the one-hand operation mode according to the exemplary embodiment of the present invention.

FIG. 9 is a diagram illustrating supporting functions of a calculator during the one-hand operation mode according to the exemplary embodiment of the present invention.

Referring to FIG. 9, when the user generates an input signal for activating a calculator function, the terminal 100 may output a right hand input module 910 having a key map area associated with a calculator on a side of a screen as illustrated in a screen 901 according to a setting of the one-hand operation mode. The screen interface of the screen 901 on the display unit 140 may include a calculator related output area 920 and the right hand input module 910. The right hand input module 910 may include a right hand key map area 911 having calculator related keys, a first blank area 913 formed at a right periphery and a bottom periphery of the right key map area 911, with each of the right periphery and the bottom periphery having a predetermined width, and a first change item area 912 arranged at a left side of the right hand key map area 911.

Meanwhile, when the user generates an input signal selecting the first change item area 912, for example, by inputting the selection represented by the greyed circle in the screen 901, the terminal 100 may control operations such that the screen 901 is changed to a screen 903 shown in FIG. 9 for substituting the right hand input module 910 with the left hand input module 930. The left hand input module 930 may include a left hand key map area 931 biased to a left side based on a central line the screen 903 of the display unit 140, a second blank area 933 formed at a left periphery and a bottom periphery of the left hand key map area 931 to have a predetermined width, and a second change item area 932. When the second change item area 932 is activated, the terminal 100 may return the screen 903 to the screen 901.

Meanwhile, when the terminal 100 is rotated from being in a portrait mode oriented in a vertical direction of a screen 903 to being in a landscape mode oriented in a horizontal direction, the terminal 100 may provide a screen interface including a left hand input module 940 based on the landscape mode and an output area 921 based on the landscape mode as illustrated in a screen 905 in FIG. 9. The left hand input module 940 based on the landscape mode may include a left hand key map area 941 based on the landscape mode biased to a left side of the screen 905 in a state of the display unit 140 which is arranged in the landscape mode, a blank area 943 based on the landscape mode formed at a left periphery and a bottom periphery of the left hand key map area 941, and a change item area 944 arranged at a right side of the left hand key map area 941 based on the landscape mode, with each of the left periphery and the bottom periphery having a predetermined width. When the user inputs a specific number using the left hand key map area 941 based on the landscape mode in this state, the change item area 944 may change the additional information output area 944 based on the landscape mode as shown in screen 905. The additional information output area 944 outputs a calculator related additional information, and previously calculated or input data having at least one result or value may be outputted in the additional information output area 944.

Referring back to screen 903, the user inputs numbers using a left hand map area 931 without rotating the terminal 100, and the terminal 100 may output the input numerals to the output area 920 in a state of maintaining the portrait mode as illustrated in a screen 907 of FIG. 9. Meanwhile, the left hand input module 930 includes the left hand key map area 931 and the second blank area 933, and the second change item area 932 in screen 903 may be converted into an additional information output area 934 in screen 907. The additional information output area 934 may output a previously input value or a result value according to a previously performed calculation. With the screen 907 being displayed and the terminal 100 oriented vertically, rotating the terminal 100 to be in landscape mode causes the screen 907 to be changed to the screen 905, as described herein.

Figure 10:
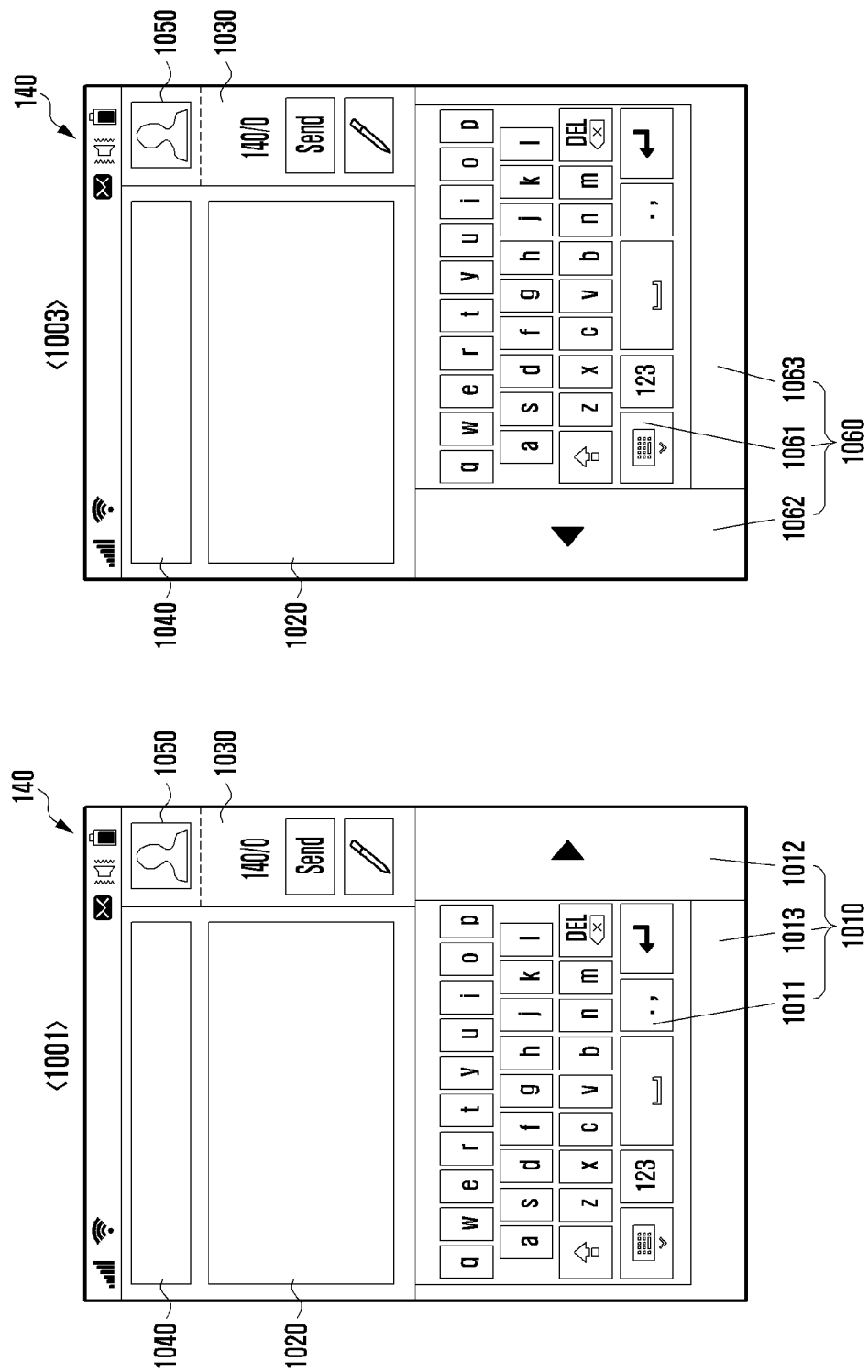
FIG. 10 is a diagram illustrating a screen interface associated with an operation of a QWERTY key map during the one-hand operation mode according to the exemplary embodiment of the present invention.

FIG. 10 is a diagram illustrating a screen interface associated with an operation of a QWERTY key map implementing a QWERTY keyboard or keypad during the one-hand operation mode according to the exemplary embodiment of the present invention.

Referring to FIG. 10, the user may generate an input signal for executing a specific user function, and the terminal 100 may call or request an input module associated with a QWERTY key map as illustrated in a screen 1001 in order to execute a corresponding user function. In this case, when the one-hand operation mode is set, the terminal 100 may provide a screen interface including a left hand input module 1010 as shown having a default format or according to a user setting. As shown, a screen interface 1001 may include a left hand input module 1010, a message output area 1020, an information input area 1040, a function item area 1030, and a phone book call area 1050. As shown in FIG. 10, the left hand input module 1010 may include a left hand key map area 1011 biased to a left side based on a central line of the screen 1001 on the display unit 140, a first blank area 1013, and a first change item area 1012.

The left hand key map area 1011 includes a plurality of keys constituting a QWERTY key map, and is biased to the left side. The size of respective keys on the left key map area 1011 are relatively smaller than an input module 151 of a basic form symmetrically arranged based on the central line of screens on the display unit 140, and the format or arrangement of the respective keys may be changed as necessary. In particular, the left hand key map area 1011 may be an area in which respective keys are arranged within a touchable range using a left thumb finger in a state such that the user grips the terminal 100 by a left hand. To this end, the terminal 100 outputs a left hand key map area 1011 within a range created based on a length of a thumb finger initially defined by a designer or the manufacturer of the terminal 100. In addition, the terminal 100 may adjust a range of a left hand key map area 1011 based on a newly defined length representing an average or typical length of the thumb finger.

The first blank area 1013 is configured to have a predetermined width and height at a periphery of the terminal 100, with the values of the predetermined width and height acquired from statistics, in which the first blank area 1013 is not typically reached due to bending of the thumb finger when the user operates a QWERTY key map included in the left hand key map area 1011. The first blank area 1013 may be an area which is impossible to touch by bending the thumb finger or is difficult to touch in a state such that the user grips the terminal 100 by a left hand. As described above, a predetermined width and length of the blank area 1013 may be determined by obtained statistics.

The first change item area 1012 is an area to which an item capable of changing an arranged form of an input module is output so that one-hand operation of a user gripping the terminal 100 by a right hand is supported upon selection thereof. When the user selects the first change item area 1012, the terminal 100 may output a right hand input module 1060 shown in the screen 1003 of FIG. 10 and biased to the right compared to the left hand input module 1010 as illustrated in a screen 1001.

As described above, when a first change item area 1012 is selected on the screen 1001 or a right hand is set by default to the one-hand operation mode according to an initial user setting or a designer or manufacturer setting, a screen 1003 may be provided and displayed on a screen of the display unit 140. The screen 1003 may provide a screen interface structure substantially similar to the screen 1001, and a right hand input module 1060 may be output to an area corresponding to the left hand input module 1010 but shifted to the right.

The right hand input module 1060 may include a right hand key map area 1061 biased to a right side based on a central line of the screen 1003 on the display unit 140, a second blank area 1063, and a second change item 1062. The right hand key map area 1061 is configured by keys constituting a QWERTY key map, has the same key format and arrangement as that of the left key map area 1011, and is biased to a right side. The second blank area 1063 may be configured at a right periphery and a bottom periphery of the right hand key map area 1061, with each of the right periphery and the bottom periphery having a predetermined width. If the second change item 1062 is selected, the terminal 100 may return from displaying the screen 1003 to displaying the screen 1001.

In the meantime, an input module including the QWERTY key map supports conversion to the landscape mode or to a portrait mode according to rotation of the terminal 100. In this case, in another exemplary embodiment described above, QWERTY key maps may be transformed and provided to be displayed suited to a landscape mode screen structure or to a portrait mode screen structure. The terminal 100 may include a left hand input module and a right hand input module having QWERTY key map areas biased to a left side or a right side in the landscape mode, as shown in FIG. 10.

In the foregoing description, the output area 1020, the function item area 1030, the information input area 1040, and the phone book call area 1050 may be areas similar to the respective areas described in FIG. 7.

Figure 11:
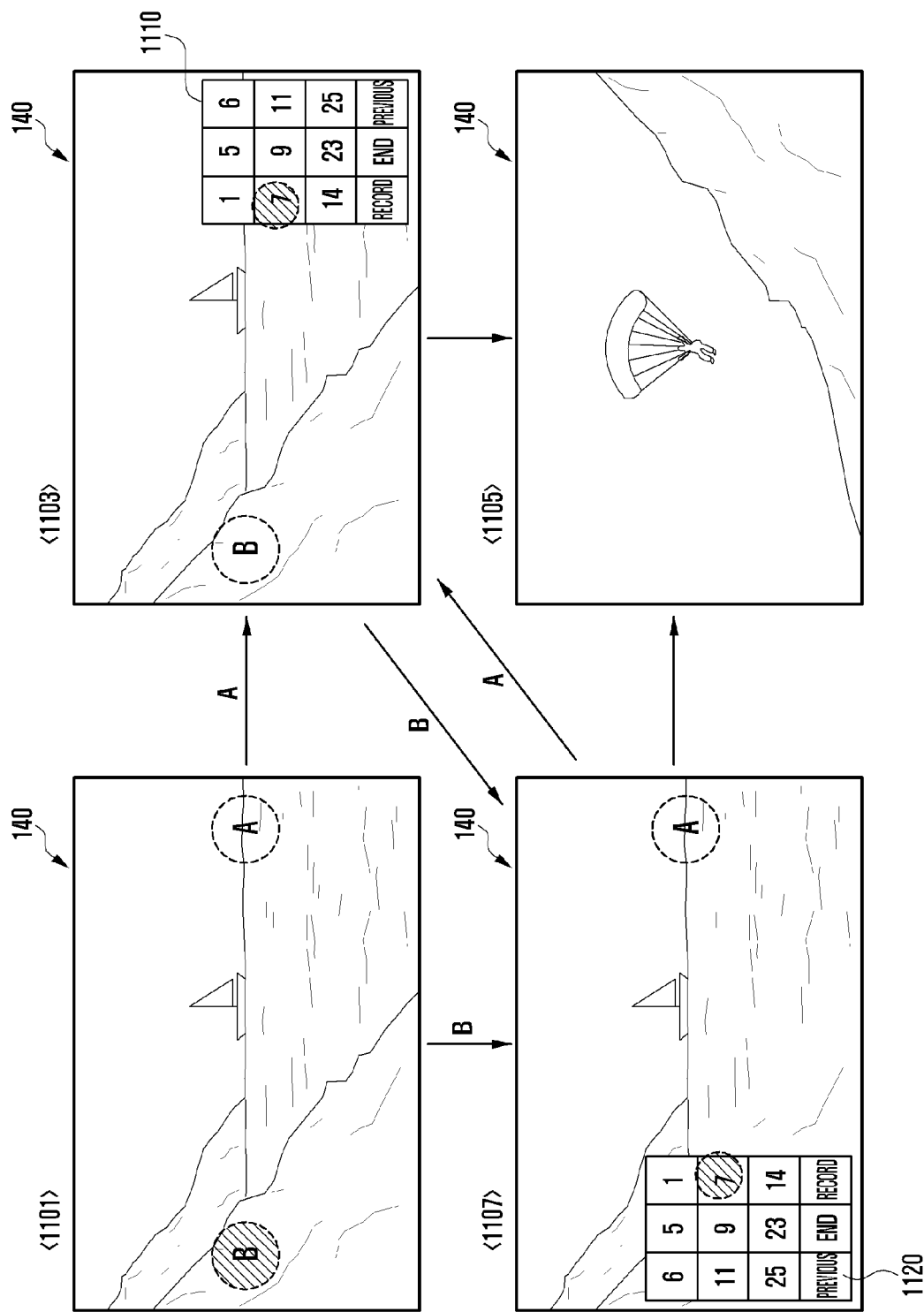
FIG. 11 is a diagram illustrating a screen interface associated with an operation of a control key map during the one-hand operation mode according to the exemplary embodiment of the present invention.

FIG. 11 is a diagram illustrating a screen interface associated with an operation of a control key map during the one-hand operation mode according to the exemplary embodiment of the present invention.

Referring to FIG. 11, the user may request to activate a specific user function to which an operation of a control key map is requested. For example, the user may generate an input signal to request activation of a broadcast receiving function. Then, the terminal 100 may receive a broadcast signal according to activation of the broadcast receiving function, decode the received broadcast signal, and output the decoded broadcast signal on the display unit 140 as illustrated in a screen 1101 of FIG. 11. In this case, a screen according to decoding the broadcast signal may be provided and displayed as a full screen as shown according to a user setting or the presence of support from the terminal 100. The terminal 100 may provide the broadcast signal screen 1101 based on the landscape mode or the portrait mode, or the landscape mode according to rotation of the terminal 100 by the user from an initial portrait mode. FIG. 11 illustrates a form and example of providing a screen based on the landscape mode, displaying content of a default or selected channel, such as a sailboat.

Meanwhile, when the user generates an input signal for calling, requesting, or activating a control key map on a right area of the screen, that is, when the user touches an area labeled "A", the terminal 100 may output a right hand control key map area 1110 biased to a right side of the display unit 140 as illustrated in a screen 1103. The right hand control key map area 1110 is an area to which at least one control key is provided in a predetermined form, such as a numerical keypad or a channel listing menu, and may be output at a location spaced apart from a right periphery and a bottom periphery of the terminal 100 by a predetermined width. In particular, the right hand control key map area 1110 may be an area located within a range by which the user may touch respective control keys of the right hand control key map area 1110 by moving a right thumb finger in a state that the user grips the terminal 100 by a right hand. Meanwhile, if an input signal selecting a specific control key, for example, a specific channel is generated on the right hand control key map area 1110, the terminal 100 may decode a broadcast signal corresponding to a selected channel, and output a screen according to a decoding signal on the display unit 140 as illustrated in a screen 1105, displaying content such as a parachutist from the selected channel "7" entered on the right hand control key map area 1110 of the screen 1103.

Referring back to the screen 1101, the user may instead touch an area labeled "B" on the screen 1101, and the terminal 100 may output a left hand control key map area 1120 biased to a left side of the display unit 140 as illustrated in a screen 1107. The left hand control key map area 1120 is an area to which at least one control key is provided and displayed in a predetermined form, and may be output at a location spaced apart from a left periphery and a bottom periphery of the terminal 100 by a predetermined width. In particular, the left hand control key map area 1120 may be an area within a range by which a user may touch respective control keys by moving a thumb finger in a state such that the user grips the terminal 100 by a left hand. Meanwhile, if an input signal selecting a specific control key, for example, a specific channel from the left hand control key map area 1120, is generated, the terminal 100 may decode a broadcast signal corresponding to a selected channel, such as channel "7", and output a screen corresponding to the broadcast signal on the display unit 140 as illustrated in a screen 1105, such as the content showing a parachutist.

Meanwhile, when either of screens 1103 and 1107 are displayed, and when the user touches the area B and the area A on a screen 1103 and a screen 1107, respectively, the terminal 100 may change the screen 1103 and the screen 1107 to the screen 1107 or the screen 1103, respectively, and display the respective control areas 1110, 1120. Accordingly, the terminal 100 may output a control key map according to a grip hand of the user while displaying a control or input area, such as keypads or blank areas for selection or data input, in an operable form by one hand. The area A and the area B of screens 1101-1107 may be defined as having a previously set width and distance from a right periphery and a left periphery, respectively.

Meanwhile, the foregoing exemplary embodiment has illustrated that an additional information output area is output instead of a change item area, but the present invention is not limited thereto. That is, the additional information output area may receive allocation of a specific area among input module areas and be displayed. For example, the present invention may be configured such that a change item area is resized, and a predetermined space to which additional information may be output is allocated to simultaneously output the additional information output area and the change item area on the display unit 100.

Figure 12:
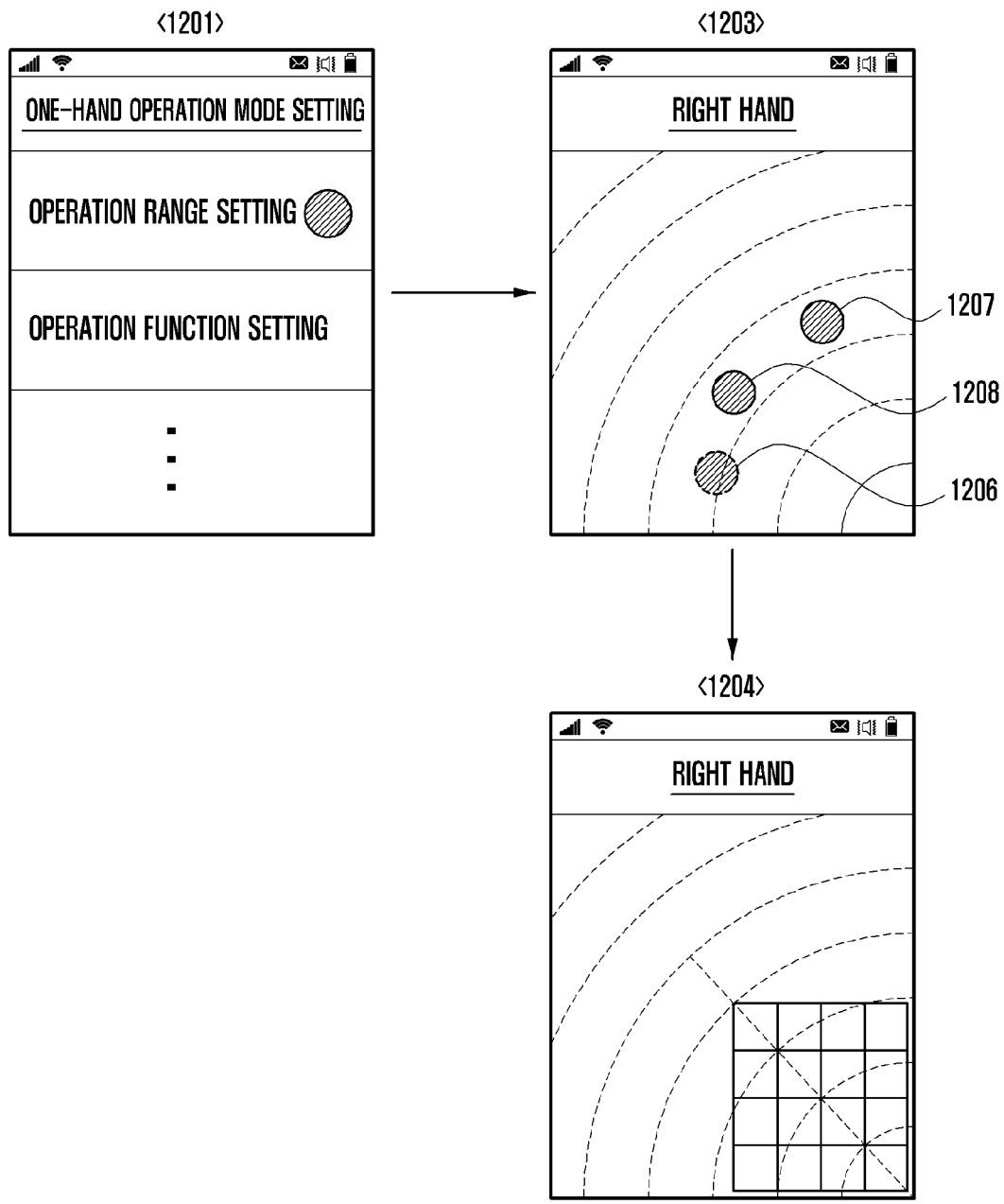
FIG. 12 is a diagram illustrating a procedure of setting a range for supporting the one-hand operation mode according to the exemplary embodiment of the present invention.

FIG. 12 is a diagram illustrating a procedure of setting a range for supporting the one-hand operation mode according to the exemplary embodiment of the present invention.

Referring to FIG. 12, the terminal 100 may support a setting function capable of inputting a touchable range of a thumb finger by users in order to support one-hand operation mode. To this end, the terminal 100 may provide a one-hand operation mode setting item displayed on a screen of the display 140. When the user selects the one-hand operation mode setting item, the terminal 100 may provide an operation range setting item and an operation function setting item as illustrated in a screen 1201. When the operation function setting item is selected, screens as illustrated in FIG. 6 may be provided.

If the operation range setting item is selected from the screen 1201, represented by the greyed circle next to the text "OPERATION RANGE SETTING" in the screen 1201, the terminal 100 may provide a screen for defining a touchable range of a thumb finger according to a one-hand grip of the user as illustrated in a screen 1203, for example for a right hand. A similar screen which is mirror symmetrical with the screen 1203, may be displayed on the display unit 140 for defining a touching range for a left hand. It is preferable that the user touch at two points of a side of the screen 1203 of the display unit 140 using a thumb finger in a specific direction. For example, the user may touch a right thumb finger at a lowermost area 1206 of screen 1203 on the display unit 140 and may touch an uppermost area 1207 of the display unit 140. In addition, the user may touch a largest possible area 1208 in a diagonal direction using a right thumb finger in a right periphery, with the touched areas 1206, 1207, and 1208 represented by the greyed circles in the screen 1203.

The terminal 100 allows a user to calculate or determine a touchable range by a thumb finger using the foregoing bottom end area 1206, top end area 1207, and largest possible area 1208, and may define the size and an output location of a right hand key map area, as shown in the screen 1204 according to a touchable range by a right thumb finger, with the square grid representing an array of actuatable screen regions defining the right hand key map area. Similarly, the terminal 100 may define the size and an output location of a left hand key map area according to a left thumb finger in the same manner or may define the size and the output location of a left hand key map area by symmetrizing a right hand key map area. The size and the location of the key map area are applicable to respective key maps to support various user functions according to a defined length of a thumb finger.

As described above, the terminal 100 and the method supporting one-hand operation mode output a key map area having a size and a location operable by one hand so that the user may operate the terminal 100 by one hand, and may simply change a location of the key map area according to the change in the hand and the appropriate touch on the screen to change the location of the key map area. The present invention may operate the terminal 100 by one hand in an operation and an environment of various user functions by defining the size and the location of a key map for one-hand operation in a landscape mode and in a portrait mode. The present invention may have the size and the location of a key map optimized in a thumb finger by users.

Meanwhile, the foregoing exemplary embodiment has illustrated that an area of a virtual key map is output to one of a right hand area and a left hand area for one hand operation of the terminal 100, but the present invention is not limited thereto. That is, the terminal 100 of the present invention may simultaneously output a right hand key map area which can be touched by a right thumb finger and a left hand key map area which can be touched by a left thumb finger on the display unit 140. In this case, as described above, the output right hand key map area and left hand key map area may be areas in which all keys are arranged within a touchable range determined according to a length of the thumb finger of the user. Such a function may be practical in the case where a user grips the terminal 100 by both hands due to stability in a trend where a screen of the display unit 140 of a portable terminal 100 is gradually changed to a large screen. That is, according to the prior art, when the user grips a large screen by both hands, although a key map is output through a full screen or a part of a screen, the key map is displayed in a central portion of the screen, which a thumb finger of the user usually cannot reach. Accordingly, in the prior art, the user grips one side of the terminal by one hand and grips an opposite side of the terminal by a finger of other hand except for a thumb finger to select a specific key output on a screen, but the terminal may inevitably be in an unstable grip state. The present invention allows a user to easily operate a key map using a thumb finger while solving the foregoing problem, and may easily support maintenance and use of the terminal 100.

The foregoing terminal 100 may further include various additional modules and components known in the art according to any known and needed functionality. That is, when the terminal 100 of the present invention is a communication terminal, the terminal 100 may include constructions and components that are not mentioned herein such as a near distance communication module for near distance communication, an interface exchanging data in a wired communication configuration or a wireless communication configuration of the terminal 100, an Internet communication module communicating with an Internet to perform an Internet function, and a digital broadcasting module receiving and broadcasting digital data and content. Since the structural elements can be variously changed according to the convergence trend of digital devices, no exhaustive list of known components, modules, and elements can be practically provided, but which can be included in the present invention. However, the terminal 100 may include structural elements equivalent to the foregoing structural elements. Further, the terminal 100 of the present invention may be substituted by specific constructions in the foregoing arrangements according to any known or desired functionality and construction. Specific elements in the foregoing arrangements of terminal 100 of the present invention may be omitted or substituted by other elements according to the desired functionality and construction to implement at least the features and functions of the present invention, as well as any additional or necessary features and functions. This can be easily understood to those skilled in the present art.

For example, the terminal 100 according to the exemplary embodiment of the present invention includes various information communication devices and multi-media devices such as a Portable Multimedia Player (PMP), a digital broadcasting player, a music player, Personal Digital Assistant (PDA), a music player (e.g., MP3 player), a portable game terminal, a smart phone, a notebook PC, and a handheld PC as well as mobile communication terminals operating based on respective communication protocols corresponding to various communication systems, and application devices thereof.

As is seen from the forgoing description, using the method of operating an input area which is output on a display unit and a terminal supporting the same according the present invention, the present invention maximizes operation performance of the terminal based on a one-hand grip of the user so that usability of the terminal is improved and the terminal can be easily operated.

The above-described apparatus and methods according to the present invention can be implemented in hardware or firmware, or as software or computer code, or combinations thereof. In addition, the software or computer code can also be stored in a non-transitory recording medium such as a CD ROM, a RAM, a ROM whether erasable or rewritable or not, a floppy disk, CDs, DVDs, memory chips, a hard disk, a magnetic storage media, an optical recording media, or a magneto-optical disk or computer code downloaded over a network originally stored on a remote recording medium, a computer readable recording medium, or a non-transitory machine readable medium and to be stored on a local recording medium, so that the methods described herein can be rendered in such software, computer code, software modules, software objects, instructions, applications, applets, apps, etc. that is stored on the recording medium using a general purpose computer, a digital computer, or a special processor or in programmable or dedicated hardware, such as an ASIC or FPGA. As would be understood in the art, the computer, the processor, microprocessor controller or the programmable hardware include volatile and/or non-volatile storage and memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, the program may be electronically transferred through any medium such as communication signals transmitted by wire/wireless connections, and their equivalents. The programs and computer readable recording medium can also be distributed in network-coupled computer systems so that the computer readable code is stored and executed in a distributed fashion.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method in a terminal for operating an input area which is output on a screen of a display unit, the method comprising:

displaying on the screen, in response to receiving a user request for activating the input area, a first input module including a key map area having keys, and a first change item indicating a moving direction of the first input module, the key map area being displayed biased towards a first direction relative to a center of the display unit;

when a signal for inputting the first change item is received, removing the first input module and the first change item from display and displaying a second input module entirely overlapping a region of the screen from which the first change item is removed, the second input module comprising a second key map including the same keys, biased towards a second direction opposite the first direction; and displaying a second change item indicating a moving direction towards the first direction.

2. The method of claim 1, further comprising:
changing an arranged direction of the terminal from a horizontal mode to a vertical mode or from the vertical mode to the horizontal mode; and
adjusting the first input module and the first change item according to the changing of the arranged direction of the terminal.

3. The method of claim 1, wherein the displaying of the first change item comprises arranging the first change item opposite to the first direction of the first input module.

4. The method of claim 1, further comprising displaying a blank area spaced apart from a side periphery and a bottom periphery of the first direction biased from the first input module by a predetermined width.

5. The method of claim 1, further comprising:
changing an arranged direction of the terminal from a horizontal mode to a vertical mode or from the vertical mode to the horizontal mode; and
arranging the first input module to be biased to the first direction by adjusting at least one of a location and a size of the first input module according to the changing of the arranged direction of the terminal.

6. The method of claim 1, further comprising:
in response to detecting a specific input signal through the key map area when at least one of the first change item and second change item is displayed, displaying within the displayed at least one of the first change item and second change item additional information associated with the specific input signal on an additional information output area of the first input module.

7. The method of claim 6, wherein the displaying of the additional information comprises:
displaying at least one recommended word associated with the specific input signal; and
displaying at least one phone number of phone book information associated with the specific input signal.

8. The method of claim 1, further comprising generating a touch event at a specific location on the screen of the display unit,
wherein the displaying of the first input module comprises outputting the first input module in a direction corresponding to a location of the touch event.

9. The method of claim 8, further comprising:
generating the touch event at another location on the screen of the display unit; removing the first input module; and outputting a second input module in a direction biased toward the other location.

10. The method of claim 1, wherein the displaying of the first input module comprises: creating the first input module by adjusting at least one of a size and a location of an input module of a basic form symmetrically displayed based on a center of the screen of the display unit or in which at least one key is arranged at the center of the screen of the display unit, and at least one of a size and a location of the input module of the basic form based on a predetermined touchable distance; and
displaying the first input module.

11. The method of claim 10, further comprising:
receiving an input signal corresponding to a selected touchable range; and
applying the touchable range to adjust at least one of the size and the form of the first input module.

12. The method of claim 1, wherein the first change item includes a first rectangular region icon disposed horizontally adjacent to the first input module, and the second change item includes a second rectangular region icon disposed horizontally adjacent to the second input module,
wherein the first rectangular icon is removed when the second change item is displayed, and the second rectangular icon is removed from display when the first change item is displayed.

13. The method of claim 1, wherein the first change item includes an image indicating the second direction opposite the first direction, and the second change item includes a second image indicating the first direction.

14. The method of claim 13, wherein the image of the first change item includes an arrow pointing towards the second direction, and the second image of the second change items includes an arrow pointing towards the first direction.

15. A terminal, comprising:
a display unit displaying an input area on a screen;
a memory; and
at least one processor operatively coupled to the memory, configured to:
in response to receiving a user request for activating the input area, control the display unit to display on the screen a first input module including a key map area having keys, and a first change item indicating a moving direction of the first input module, the key map area being displayed biased towards a first direction relative to a center of the display unit;
when a signal for inputting the first change item is received, remove the first input module from display and control the display unit to display a second input module disposed entirely overlapping a region of the screen from which the first change item is removed, the second input module having a second key map including the same keys, biased towards a second direction opposite the first direction; and
control the display unit to display a second change item indicating a moving direction towards the first direction.

16. The terminal of claim 15, wherein the display unit displays the first input module and the first change item by adjusting at least one of a location and a size according to the changing of an arranged direction of the terminal, when an event for changing the arranged direction of the terminal from a horizontal mode to a vertical mode or from the vertical mode to the horizontal mode.

17. The terminal of claim 15, wherein the display unit displays a blank area spaced apart from a side periphery and a bottom periphery of the first direction biased from the first input module by a predetermined width.

18. The terminal of claim 15, wherein the at least one processor is further configured to:
arrange the first input module to be biased to the first direction by adjusting at least one of a location and a size of the first input module according to the changing of an arranged direction of the terminal when the arranged direction of the terminal is changed from a horizontal mode to a vertical mode or from the vertical mode to the horizontal mode.

19. The terminal of claim 15, wherein the at least one processor is further configured to:
in response to detecting a specific input signal through the key map area when at least one of the first change item and the second change item is displayed, control the display unit to display additional information associated with the specific input signal.

20. The terminal of claim 19, wherein the additional information includes display of at least one of:

at least one recommended word associated with the specific input signal; and at least one phone number of phone book information associated with the specific input signal.

21. The terminal of claim 15, wherein the at least one processor is further configured to:

control the display unit such that the first input module is output in a direction of a touch event when the touch event is generated at a specific location on the screen of the display unit; and remove the first input module and output a second input module in a direction biased toward another location on the screen when the touch event is generated at the other location on the screen of the display unit.

22. The terminal of claim 15, wherein the at least one processor is further configured to:

adjust at least one of a size and a location of an input module of a basic form having a corresponding key map with keys of the same key types as the keys of the first input module based on a previously defined touchable range and symmetrically displayed based on a central line of the display unit or in which keys are arranged at a central portion of the screen to generate and display the first input module.

23. The terminal of claim 22, wherein the at least one processor is further configured to:

receive an input signal corresponding to a selected touchable range, and apply the touchable range according to the received input signal to adjust at least one of the size and the form of the first input module.

24. The terminal of claim 15, wherein the first change item includes a first rectangular region icon disposed horizontally adjacent to the first input module, and the second change item includes a second rectangular region icon disposed horizontally adjacent to the second input module, wherein the first rectangular icon is removed when the second change item is displayed, and the second rectangular icon is removed from display when the first change item is displayed.

25. The terminal of claim 15, wherein the first change item includes an image indicating the second direction opposite the first direction, and the second change item includes a second image indicating the first direction.

26. The terminal of claim 25, wherein the image of the first change item includes an arrow pointing towards the second direction, and the second image of the second change items includes an arrow pointing towards the first direction.

* * * * *